United States Patent [19]
Srinivas et al.

[11] Patent Number: 6,099,819
[45] Date of Patent: Aug. 8, 2000

[54] CATALYSTS FOR THE SELECTIVE OXIDATION OF HYDROGEN SULFIDE TO SULFUR

[75] Inventors: Girish Srinivas, Thornton, Colo.; Chuansheng Bai, Baton Rouge, La.

[73] Assignee: TDA Research, Inc., Wheat Ridge, Colo.

[21] Appl. No.: 09/234,367

[22] Filed: Jan. 20, 1999

Related U.S. Application Data

[60] Provisional application No. 60/122,047, Jan. 26, 1998.

[51] Int. Cl.$^7$ ............................. C01B 17/04; B01D 53/52
[52] U.S. Cl. ................................. 423/573.1; 423/576.8; 423/242.1; 423/244.06; 502/514
[58] Field of Search .................... 423/573.1, 576.8, 423/242.1, 244.06; 502/514

[56] References Cited

U.S. PATENT DOCUMENTS

| | | | |
|---|---|---|---|
| 3,880,986 | 4/1975 | Beavon | 423/539 |
| 4,002,720 | 1/1977 | Wheelock et al. | 423/230 |
| 4,088,743 | 5/1978 | Hass et al. | 423/539 |
| 4,169,136 | 9/1979 | Hass et al. | 423/539 |
| 4,196,101 | 4/1980 | Wilson et al. | 252/252 |
| 4,197,277 | 4/1980 | Sugier et al. | 423/231 |
| 4,243,647 | 1/1981 | Hass et al. | 423/573 |
| 4,246,141 | 1/1981 | Hass et al. | 252/455 Z |
| 4,279,882 | 7/1981 | Beavon | 423/574 R |
| 4,311,683 | 1/1982 | Hass et al. | 423/573 |
| 4,314,983 | 2/1982 | Hass et al. | 423/542 |
| 4,406,873 | 9/1983 | Beavon | 423/574 R |
| 4,432,961 | 2/1984 | Hass et al. | 423/542 |
| 4,439,412 | 3/1984 | Behie et al. | 423/573 G |
| 4,444,741 | 4/1984 | Hass et al. | 423/542 |
| 4,444,742 | 4/1984 | Hass et al. | 423/573 |
| 4,444,908 | 4/1984 | Hass et al. | 502/247 |
| 4,508,699 | 4/1985 | Schoofs | 423/574 R |
| 4,519,992 | 5/1985 | Alkhazov et al. | 423/230 |
| 4,528,277 | 7/1985 | Hass et al. | 502/79 |
| 4,552,746 | 11/1985 | Kettner et al. | 423/573 G |
| 4,623,533 | 11/1986 | Broecker et al. | 423/573 |
| 4,640,908 | 2/1987 | Dupin | 502/243 |
| 4,818,740 | 4/1989 | Berben et al. | 502/313 |
| 4,857,297 | 8/1989 | Kettner et al. | 423/576.8 |
| 4,886,649 | 12/1989 | Ismagilov et al. | 423/230 |
| 4,937,058 | 6/1990 | Dupin et al. | 423/224 |
| 4,982,003 | 1/1991 | Hara et al. | 564/480 |
| 5,037,629 | 8/1991 | Berben et al. | 423/576.8 |
| 5,176,896 | 1/1993 | Bela | 423/574 R |
| 5,256,384 | 10/1993 | Rolke et al. | 423/220 |
| 5,286,697 | 2/1994 | van den Brink et al. | 502/257 |
| 5,352,422 | 10/1994 | van den Brink et al. | 423/224 |
| 5,397,556 | 3/1995 | Towler et al. | 423/220 |
| 5,466,427 | 11/1995 | Rumpf et al. | 423/210 |
| 5,480,636 | 1/1996 | Maruo et al. | 424/76.21 |
| 5,512,258 | 4/1996 | Bouyanov et al. | 423/230 |
| 5,512,260 | 4/1996 | Kiliany et al. | 423/242.1 |
| 5,547,649 | 8/1996 | Beck et al. | 423/230 |
| 5,597,546 | 1/1997 | Li et al. | 423/573.1 |

FOREIGN PATENT DOCUMENTS

| | | | |
|---|---|---|---|
| 0 078 690 A2 | 5/1983 | European Pat. Off. | 423/576.8 |
| 0 215 317B1 | 8/1986 | European Pat. Off. | C01B 17/04 |
| 2 702 674 | 3/1993 | France | B01D 53/36 |
| 2 702 674 A1 | 9/1994 | France | B01D 53/36 |
| 59-39345 | 3/1984 | Japan | 423/244.06 |
| 622324 | 4/1949 | United Kingdom | 423/576.8 |
| 1461070 | 2/1977 | United Kingdom . | |
| 2143225A | 2/1985 | United Kingdom . | |

OTHER PUBLICATIONS

Hutchings, G.J. (May 1992) "Catalysis and Environment," Applied Catalysis A: General 84(2): pp.

Chowdhury, A.I. and Tollefson, E.L. (Jun. 1990), "Catalyst Modification and Process Design Consideration for the Oxidation of Low concentrations of Hydrogen Sulfide in Natural Gas," Can. J. Chem. Eng. 68:449–454.

Dalai, A.K. et al. (Feb. 1993), "The Effects of Pressure and Temperature on the Catalytic Oxidation of Hydrogen Sulfide in natural Gas and Regeneration of the Catalyst to Recover the Sulfur Produced," Can. J. Chem. Eng. 71:75–82.

Ghosh, T.K. and Tollefson, E.L. (Dec. 1986), "A Continuous Process for Recovery of Sulfur from Natural Gas Containing Low Concentrations of Hydrogen Sulfide," Can J. Chem. Eng. 64:960–968.

Goar, B.G. et al. (May–Jun. 1992), "Superclaus: performance world–wide ," Sulphur, No. 22:44–47.

*Primary Examiner*—Steven P. Griffin
*Assistant Examiner*—Timothy C Vanoy
*Attorney, Agent, or Firm*—Greenlee, Winner & Sullivan, P.C.

[57] ABSTRACT

This invention provides catalysts for the oxidation of hydrogen sulfide. In particular, the invention provides catalysts for the partial oxidation of hydrogen sulfide to elemental sulfur and water. The catalytically active component of the catalyst comprises a mixture of metal oxides containing titanium oxide and one or more metal oxides which can be selected from the group of metal oxides or mixtures of metal oxides of transition metals or lanthanide metals. Preferred metal oxides for combination with $TiO_2$ in the catalysts of this invention include oxides of V, Cr, Mn, Fe, Co, Ni, Cu, Nb, Mo, Tc, Ru, Rh, Hf, Ta, W, Au, La, Ce, Pr, Nd, Pm, Sm, Eu, Gd, Tb, Dy, Ho, Er, Tm, Yb, and Lu. Catalysts which comprise a homogeneous mixture of titanium oxide and niobium (Nb) oxide are also provided. A preferred method for preparing the precursor homogenous mixture of metal hydroxides is by coprecipitation of titanium hydroxide with one or more other selected metal hydroxides. Catalysts of this invention have improved activity and/or selectivity for elemental sulfur production. Further improvements of activity and/or selectivity can be obtained by introducing relatively low amounts (up to about 5 mol %)of a promoter metal oxide (preferably of metals other than titanium and that of the selected second metal oxide) into the homogeneous metal/titanium oxide catalysts of this invention.

26 Claims, 14 Drawing Sheets

CATALYSTS FOR THE SELECTIVE OXIDATION OF HYDROGEN SULFIDE TO SULFUR

CROSS-REFERENCE TO RELATED APPLICATIONS

This application takes priority under 35 U.S.C. § 119(e) to U.S. patent application Ser. No. 09/013,524 filed Jan. 26, 1998 converted on Jan. 7, 1999 to U.S. provisional application Ser. No. 60/122047.

This invention was made at least in part with United States Government funding through Department of Energy Grant No.DE-FG03-95ER82088. The United States Government has certain rights in this invention.

FIELD OF THE INVENTION

This invention is in the field of catalysts and relates to mixed metal oxide catalysts for the oxidation of hydrogen sulfide ($H_2S$) to sulfur and water.

Because hydrogen sulfide greatly increases the rate of pipeline corrosion, the hydrogen sulfide content of gas entering the natural gas pipeline systems must be reduced to less than 4 ppm. The removal of hydrogen sulfide is, thus, a major process requirement in gas processing plants. Hydrogen sulfide is also generated in oil refineries and other industrial processes.

Once removed from the natural gas, hydrogen sulfide must be disposed of safely, since it is extremely toxic. The current threshold limit value for hydrogen sulfide is 10 ppm over an eight hour average. Burning hydrogen sulfide to sulfur dioxide and venting it is no longer an acceptable method of disposal of the hydrogen sulfide, since sulfur dioxide is a precursor to acid rain. The accepted method of disposing the hydrogen sulfide recovered from natural gas is to convert the hydrogen sulfide to sulfur (which is benign), which is then used in the manufacture of sulfuric acid, or sent to landfills.

The state-of-the-art process for converting hydrogen sulfide to sulfur is the Claus process. In the first step of the Claus reaction, about one third of the hydrogen sulfide present is oxidized to sulfur dioxide. In the second step, the remaining hydrogen sulfide and the sulfur dioxide are reacted to form sulfur in a Claus reactor according to the reaction:

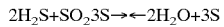

Unfortunately, this reaction is limited by thennodynamic equilibrium and only a portion of the sulfur can be recovered. Multiple stages with sulfur condensation between stages increases sulfur recovery. For example, three stages are required to achieve a 97% sulfur recovery efficiency. Higher levels of sulfur recovery efficiency are needed to meet regulations. Even small changes in the composition of the feed gas stream, temperature, or residence time can affect the efficiency of Claus reactors. The presence of carbon dioxide in the feed can result in the formation of undesired carbonyl sulfide, which is difficult to convert to sulfur. The presence of hydrocarbons in the feed can result in catalyst deactivation and an overall reduction in process efficiency. Further, Claus reactors are not economical at scales less than about 10 tons/day (TPD). There is a clear need for efficient processes for recovering sulfur from process streams, especially for small scale process streams.

The sulfur recovery efficiency in Claus plants can be increased by the addition of tail gas treatment processes, which treat the hydrogen sulfide and sulfur dioxide in the Claus tail gas and convert them to sulfur. Several of such processes have been described. For example, GB patent 1,461,070 describes the SCOT process for treating tail gases in which sulfur dioxide is catalytically reduced to hydrogen sulfide (for removal by liquid absorption).

The selective oxidation of hydrogen sulfide to sulfur and water, according to the reaction:

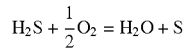

is an attractive method for converting the hydrogen sulfide to sulfur. Unlike the Claus reaction, the selective oxidation reaction is not limited by equilibrium and high sulfur recovery efficiencies are possible in a single stage.

Numerous patents describe catalysts and processes for the partial oxidation of hydrogen sulfide to sulfur and water.

A major drawback of selective hydrogen sulfide oxidation catalysts has been the production of sulfur dioxide as a by-product. Hydrogen sulfide can be completely oxidized to sulfur dioxide; any sulfur formed from hydrogen sulfide can be further oxidized to sulfur dioxide; and sulfur formed can also react with water to form hydrogen sulfide and sulfur dioxide (the Reverse Claus reaction). The preferred catalyst for applications to sulfur recovery will catalyze the partial oxidation of hydrogen sulfide to sulfur without substantially catalyzing the side reactions to produce sulfur dioxide.

U.S. Pat. No. 4,311,683 relates to a process for passing hydrogen sulfide-containing gas mixed with oxygen over a catalyst containing vanadium oxides and vanadium sulfides on a non-alkaline, porous refractory carrier. U.S. Pat. No. 5,352,422 relates to a process for treating Claus tail gas to oxidize hydrogen sulfide to elemental sulfur. The catalyst is described as having a specific surface area of 20 $m^2/g$, an average pore size radius of at least 50 Å and no Claus activity which is defined as "the absence of influence of water on selectivity of the oxidation reaction of $H_2S$ to sulphur in the presence of minimally a stoichiometrical amount of $O_2$ at 250° C." The patent specifically describes a catalyst prepared by impregnation of an iron-containing solution or an iron/chromium-containing solution into several carriers followed by heating in air at 500° C. to generate an oxide phase.

Activated carbon and ammonium sulfate-modified carbon catalysts have been assessed for the selective oxidation of hydrogen sulfide to sulfur (Dalai, A. K. et al. (1993) Can. J. Chem. Eng. 71:75; Chowdhury, A. I. and E. L. Tollefson (1990) Can J. Chem. Eng. 68:449; Ghosh, T. and E. L. Tollefson (1986) Can. J. Chem. Eng. 64:960). When the reaction was carried out at low temperatures (less than 175° C.) to enhance selectivity to sulfur, all of the catalysts exhibited considerable deactivation within a few hours of operation. If higher temperatures were used, the deactivation was not so pronounced, but the production of sulfur dioxide increased.

The "SUPERCLAUS" process has been described in U.S. Pat. No. 5,352,422 that carries out the oxidation of hydrogen sulfide to sulfur over an $FC_2O_3/SiO_2/Al_2O_3$ catalyst. The catalyst is not selective enough for use in small scale process streams as a stand-alone process.

U.S. Pat. No. 4,197,277 relates to a catalyst with iron and vanadium oxide active materials on an aluminum oxide carrier for conversion of hydrogen sulfide to sulfur. The conversion is inefficient due to formation of sulfur dioxide. See: Goar, B. G. et al. (1992) Sulfur 220:45.

U.S. Pat. No. 4,519,992 relates to a process for purifying gases of hydrogen sulfide using a catalyst having the following composition by weight: 10–30% titanium oxide, 20–30% iron oxide, 20–25% zinc oxide and 20–50% chromium oxide. The process requires a specific ratio of $H_2SiO_2$ in the gas reaction stream of 1:1–1.5 and is exemplified for use with gas streams containing 3% $H_2S$ by volume. In U.S. Pat. No. 4,886,649, a later issuing patent having inventors in common with the 4,519,992 patent, the process is said to be suitable only for purification of gases containing a maximum of 3% $H_2S$ by volume.

U.S. Pat. No. 4,886,649 relates to a two-stage catalytic process in series to convert hydrogen sulfide (up to 25%) to sulfur with very low selectivity to sulfur dioxide. The first stage consists of a catalytic reaction of the hydrogen sulfide stream with oxygen on 10–20% magnesium chromate supported on $Al_2O_3$. In the second stage, unreacted hydrogen sulfide is treated with oxygen over vanadia or titania based catalysts.

U.S. Pat. Nos. 4,552,746 and 4,857,297 relate to a catalyst consisting essentially of titanium oxide (at least 80% by weight) for the removal of sulfur components, including hydrogen sulfide, from gas streams with production of elemental sulfur. The catalysts optionally contain 5 to 25% by weight alkaline earth metal sulfate. Conversion efficiency is reported to be highly dependent upon water content in the gas stream and gas streams with less than 10% by volume water are preferred.

U.S. Pat. Nos. 4,818,740, 5,037,629 and 5,352,422 relate to selective catalysts for the oxidation of hydrogen sulfide to elemental sulfur. The catalyst is described as having specific limits on the specific area (less than 20 $m^2$/g) and pore size (low microporosity). The catalyst is further described as a supported catalyst comprising a carrier having at least 0.1% by weight catalytically active material applied thereto. The carrier is described as one that does not exhibit alkaline properties. Preferred catalytically active materials are said to be metal oxides or mixed metal oxides. The patents specifically note a catalytic material that is an iron oxide or an oxide of iron and chromium. An incipient wetness impregnation method is described for preparation of supported catalyst.

U.S. Pat. No. 4,623,533 relates to desulfurization of hydrogen sulfide-containing gases by oxidation of hydrogen sulfide to sulfur. The catalyst used is described as a supported titanium dioxide catalyst containing 0.1 to 25% by weight nickel oxide and from 0–10% by weight aluminum oxide.

While several types of catalysts have been described for the partial oxidation of hydrogen sulfide to elemental sulfur, there remains a significant need in the art for efficient, selective catalysts that are substantially insensitive to potential process stream components including water, carbon dioxide, and hydrocarbons.

SUMMARY OF THE INVENTION

This invention provides catalysts for the oxidation of hydrogen sulfide. In particular, the invention provides catalysts for the partial oxidation of hydrogen sulfide to elemental sulfur and water. The catalytically active component of the catalyst comprises a mixture of metal oxides containing titanium oxide and one or more metal oxides. The other metal oxides can be selected from the group of metal oxides or mixtures of metal oxides of transition metals or lanthanide metals. Preferred metal oxides for use in the catalysts of this invention are those of a metal that is not poisoned by hydrogen sulfide. Preferred metal oxides for combination with $TiO_2$ in the catalysts of this invention include oxides of V, Cr, Mn, Fe, Co, Ni, Cu, Nb, Mo, Tc, Ru, Rh, Hf, Ta, W, Au, La, Ce, Pr, Nd, Pm, Sm, Eu, Gd, Tb, Dy, Ho, Er, Tm, Yb, and Lu.

More preferred catalysts of this invention are homogenous mixtures of titanium oxide and one or more oxides selected from the group of metal oxides of Nb, V, Cr, Mn, Fe, Co, Ni, Cu, Mo, and W. Catalysts which comprise a homogeneous mixture of titanium oxide and niobium (Nb) oxide are most preferred.

The catalysts are prepared as a mixtures of titanium oxide and the selected metal oxide(s). A preferred method for preparing the catalytically active mixture of metal oxides is by initial preparation of a homogenous mixture of the corresponding metal hydroxides which is then calcined to form the homogenous mixture of metal oxides. A preferred method for preparing the precursor homogenous mixture of metal hydroxides is by coprecipitation of titanium hydroxide with one or more other selected metal hydroxides. Metal hydroxide coprecipitation can be done, for example, by hydrolysis of a soluble mixture of titanium precursors and other metal precursors (e.g., a mixture of metal salts or metal complexes in an appropriate solvent) to generate insoluble metal hydroxides which coprecipitate as a homogenous mixture of hydroxides. Mixed metal/titanium oxide catalysts prepared by these coprecipitation methods are homogeneous mixtures of oxides and are distinct in structure and catalytic activity from titanium oxide-supported transition metal (or metal oxides) prepared using the incipient wetness impregnation technique. The catalytic, homogenous mixtures of metal/titanium oxides of this invention are also distinct from simple mixtures of metal oxides and simple mixtures of metal hydroxides that are calcined to form mixed metal oxides.

The mixture of metal-titanium oxides of the catalysts of this invention preferably contains 30 mole % or less of the second metal oxide or mixture of metal oxides. More preferably the catalyst contains 10 mole % or less of the second metal oxide or mixture of metal oxides.

Catalysts of this invention have improved activity and/or selectivity for elemental sulfur production. Further improvements of activity and/or selectivity can be obtained by introducing relatively low amounts (up to about 5 mol %)of a promoter metal oxide (preferably of metals other than titanium and that of the selected second metal oxide) into the homogeneous metal/titanium oxide catalysts of this invention. Promoters can be introduced into the catalyst of this invention during initial preparation of the homogeneous titanium/metal oxide by combining the desired amount of the promoter metal precursor with the titanium and other metal precursor(s) prior to coprecipitation. Promoters can also be introduced into the mixed titanium-metal oxide catalyst by incipient wetness impregnation using solutions of selected metal salts or metal complexes.

Promoters can be selected from transition and lanthanide metals including V, Cr, Mn, Fe, Co, Ni, Cu, Nb, Mo, Tc, Ru, Rh, Hf, Ta, W, Au, La, Ce, Pr, Nd, Pm, Sm, Eu, Gd, Tb, Dy, Ho, Er, Tm, Yb, and Lu. Preferred promoters are transition metals/metal ions and more preferred are the metals/metal ions of V, Cr, Mn, Fe, Co, Ni, Cu, Mo, and W.

Under reaction conditions, some or all of the oxides in the catalyst of this invention may be converted to the corresponding metal sulfides or sulfates, which are also active for the selective oxidation reaction.

The activity and selectivity for sulfur production of mixed metal oxide catalysts of this invention can be significantly higher than other reported catalysts for reaction with hydrogen sulfide and represent a significant improvement over the prior art. Preferred levels of sulfur selectivity (S selectivity) are greater than about 80%. More preferred catalysts of this invention exhibit levels of S selectivity greater than about 95% at an operating temperature between about 100° C. and about 400° C. Mixed metal oxide catalysts of this invention can also exhibit high hydrogen sulfide conversion ($H_2S$ conversion). Preferred levels of $H_2S$ conversion are greater than about 85%. More preferred catalysts of this invention exhibit $H_2S$ conversion levels greater than about 90% at an operating temperature between about 100° C. and about 400° C.

The catalysts of this invention are suitable for use in any reactor systems and particularly with either fixed and fluid bed reactors and can be prepared as powders or pressed into pellets, plugs and other shapes suitable for use in a given reactor configuration.

The mixed metal oxide catalysts of this invention can also be prepared as supported catalysts. Preferred support materials are α-alumina and silica materials. Supported catalysts are preferably formed by generation of a homogeneous mixture of metal hydroxides on the support followed by calcination in air to form a homogeneous mixture of metal oxides. Supported catalysts comprise a homogeneous mixture of $TiO_2$ and a second metal oxide as described above. Preferred supported catalysts comprise an alumina supported homogeneous mixture of Nb and Ti oxides.

The catalysts of this invention function in the presence of potentially interfering substances, such as carbon dioxide, water, and hydrocarbons, including methane, benzene, toluene, xylene, among others. Catalysts of this invention can function efficiently in the presence of any concentration of carbon dioxide, in the presence of 30% water, and in the presence of hydrocarbon streams commonly found in acid gas generated from amine plants without substantial loss of conversion efficiency and selectivity for sulfur. Catalysts of this invention can operate at temperatures between about 100° C. and about 400° C., the preferred operating temperature in practice dependent upon the sulfur dew point of the product stream at the reactor outlet. In general, it is preferred to use lower temperatures to minimize oxidation to sulfur dioxide.

This invention provides a method for partial oxidation of hydrogen sulfide to sulfur employing the homogeneous metal/$TiO_2$ catalysts described herein. Hydrogen sulfide is directly oxidized in a single (or multiple stage) reaction by contacting a feed gas stream containing hydrogen sulfide with an oxygen-containing gas (e.g., air or $O_2$) over the catalyst. The catalyst of this invention can be employed in a variety of reactors and will generally function with feed streams containing a range of hydrogen sulfide up to about 90% by volume. The catalyst can be employed with more typical feed streams containing up to 35–40% $H_2S$ and functions particularly well with feed streams containing 10% or less $H_2S$ (by volume).

DETAILED DESCRIPTION OF THE INVENTION

Figure 1:
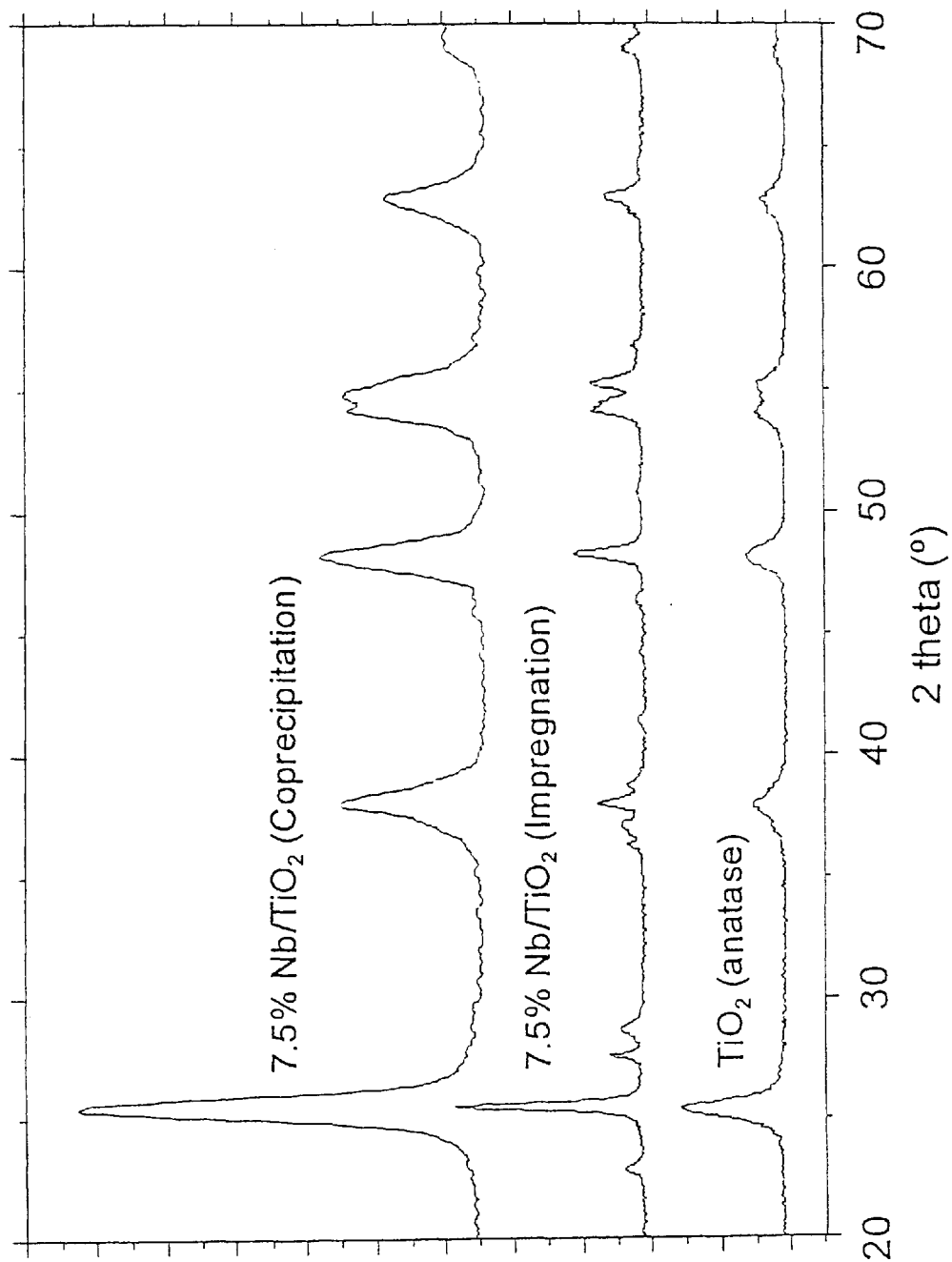
FIG. 1 provides a comparison of XRD traces of (a) 7.5%Nb/$TiO_2$ prepared by coprecipitation, (b) 7.5% Nb/$TiO_2$ prepared by incipient wetness impregnation and (c) $TiO_2$ (anatase).

The catalysts of this invention can be used to selectively oxidize hydrogen sulfide to sulfur and water according to equation 1.

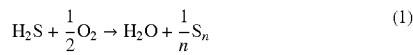

$$H_2S + \frac{1}{2}O_2 \rightarrow H_2O + \frac{1}{n}S_n \qquad (1)$$

Unlike the Claus reaction, the selective oxidation reaction (eq. 1) is not limited by equilibrium, and all of the hydrogen sulfide can theoretically be converted to sulfur. In the absence of an effective catalyst, the reaction of hydrogen sulfide with oxygen results in the formation of significant quantities of sulfur dioxide and water, in addition to the formation of some sulfur. The side reaction resulting in the formation of sulfur dioxide reduces the efficiency of the process for the conversion of hydrogen sulfide to sulfur.

This invention describes mixed metal oxide catalysts that selectively catalyze the oxidization of hydrogen sulfide to elemental sulfur. The invention provides methods of preparing the catalytic mixed metal oxides, promoted mixed metal oxide catalysts, and supported mixed metal oxide catalysts. The invention also describes methods for the conversion of hydrogen sulfide to sulfur using these catalysts.

Preferred catalysts for the selective oxidation of hydrogen sulfide to sulfur and water comprise oxides of Ti and Nb, with or without added promoters from the oxides of V, Cr, Mn, Fe, Co, Ni, Cu, Mo, and W. Under reaction conditions, some or all of these oxides may be converted to sulfides or sulfates, which are also active for the selective oxidation reaction. The catalysts, when placed in a fixed bed, or fluidized bed reactor, in the presence of air (or 20 oxygen) will selectively oxidize the hydrogen sulfide to sulfur, with the formation of only small amounts of sulfur dioxide. The amount of air needed for the reaction is dictated by the reaction stoichiometry depicted in eq.1, and is typically between about 90% and about 120% of that required for stoichiometric conversion of hydrogen sulfide to sulfur. The sulfur vapor in the reactor outlet is typically recovered as molten or solid sulfur by condensing in a down-stream heat exchanger. The catalyst can operate in the presence of impurities such as carbon dioxide, water, and hydrocarbons. The catalyst can operate at temperatures between about 100° C. and about 400° C., depending on the sulfur dew point of the product stream at the reactor outlet. The reactor is preferably operated at a high enough temperature to avoid condensation of sulfur in the system and on the catalyst.

Catalyst Preparation

Mixed metal oxide catalysts of this invention are prepared generally by 5 hydrolysis/coprecipitation from solutions containing the selected metal precursors to give mixtures of metal hydroxides. The metal hydroxide mixtures are then calcined under oxidizing conditions to give the catalytic mixed metal oxides. The preparation of catalysts of this invention is exemplified by several alternative methods of preparation of Nb/TiO$_2$ catalysts. The preparation of other mixed metal oxide/TiO$_2$ catalysts are analogous.

The Nb/TiO$_2$ catalysts can be made by co-precipitation/hydrolysis of niobium (V) and titanium (IV) isopropoxides. In this synthesis, the required quantities of niobium isopropoxide [Nb(OC$_3$H$_7$)$_5$] and titanium isopropoxide [Ti(OC$_3$H$_7$)$_4$] are dissolved in 2-propanol and the solution containing both metal alkoxide precursors is added dropwise into water at room temperature, with continuous stirring for proper mixing. After addition, the mixture is stirred for an additional hour at room temperature. Dropwise addition of the solution into water is believed to result in uniform hydrolysis of the metal isopropoxides forming a substantially amorphous precipitate which is a homogeneous mixture of niobium and titanium hydroxides. The precipitate is filtered and washed with excess water. The resulting washed precipitate cake is dried overnight at 50° C.–50° C. The dried cake is calcined in air at 250° C.–850° C. for about 4 to about 18 hours to remove hydrocarbon impurities in the catalyst and to convert the hydroxides to oxides. This preparation technique provides a homogeneous mixture of Ti and Nb oxides, where some of the Nb can be incorporated inside the titania lattice.

The metal isopropoxide precursors in the above preparation can be replaced with the 25 respective metal halides, for example the respective metal chlorides, e.g. TiCl$_4$ and NbCl$_5$, for preparation of Nb/TiO$_2$ catalysts. The halide precursors are dissolved in an aqueous solution, e.g. a mixture of 2-propanol and water, in amounts to achieve the desired relative stoichiometry. To minimize instantaneous hydrolysis, the metal halide precursors, e.g., TiCl$_4$ and NbCl$_5$, are cooled to 5° C.–20° C. prior to their addition to cooled aqueous solvent mixture. Urea (or other precipitating agent) is then added to the metal halide solution preferably in an amount in excess of that which will render the solution pH neutral. Urea decomposes on heating to release ammonia (ammonium hydroxide in aqueous solution) to increase the solution pH and cause precipitation of the metal hydroxides. The metal halide solution containing urea is heated to 60° C.–100° C. using a reflux condenser. Under these conditions, urea decomposes releasing ammonia (ammonium hydroxide in aqueous solution) to slowly increase the pH (to slightly higher than pH 7) of the solution and initiate precipitation of the metal hydroxide. It is believed that a uniform and homogeneous mixture of metal hydroxides is formed on hydrolysis. After the mixture is cooled, the metal hydroxide precipitate is washed thoroughly to remove trace quantities of the halide. The precipitate is dried, and calcined as described above.

In another alternative preparation, titanium oxysulfate (TiOSO$_4$) is combined with a metal precursor such as a halide, e.g. NbCl$_5$ to make the mixed metal oxide catalyst. TiOSO$_4$ and NbCl$_5$ are dissolved in a solution of urea in water. The amount of urea employed is in excess of the amount needed, upon decomposition, to neutralize the solution. The solution is then heated to 60° C.–100° C. (under reflux). The urea decomposes, generating ammonia (ammonium hydroxide in aqueous solution) and increasing the pH of the solution (pH of 7–9) As the pH of the solution increases, titanium oxysulfate and the metal halide (niobium chloride) are converted to a homogeneous mixture of their respective hydroxides which precipitates out of solution. The metal hydroxide precipitate is washed to remove trace amounts of sulfate and halides. The washed precipitate cake is dried and calcined as described above to form a uniform mixture of the metal oxides.

Titanium oxysulfate can be replaced in this preparation with titanium sulfate, titanium nitrate, titanium potassium oxalate among other titanium precursor compounds. In addition to metal halides and isopropoxides other metal salts or complex precursors can be used in the coprecipitation methods described, including metal nitrates and sulfates.

The catalytic homogeneous mixture of metal oxides of this invention, with BET surface areas in excess of 75 m$^2$/g, cannot be fonned by individual precipitation of the metal hydroxides followed by physically mixing and subsequent calcination of the physical mixed metal oxide mixture.

In particular, other metal-doped titania catalysts (M-TiO$_2$) where M is a transition metal or Lanthanide metal, particularly a metal or mixture of metals selected from the list: V, Cr, Mo, W, Mn, Fe, Co, Ni, and Cu can be made employing similar coprecipitation methods using a titanium salt or titanium complex precursor and a metal salt or metal complex precursor (or mixture of different metal precursors) of the selected metals.

Urea can be substituted in the procedures described above by acetamide, hexamethylenetetramine, propionamide or related precipitation agents which will decompose at mild temperatures to generate $NH_4OH$ to raise the solution pH and gradually cause hydrolysis/precipitation of the metal precursor salts and complexes into their hydroxides.

The dissolved metal precursors can also be precipitated out as hydroxides by neutralizing the solution by addition of an aqueous alkali solution (e.g., NaOH) to form a homogeneous precipitate of metal hydroxides.

Promoted mixed metal oxide catalysts

Homogenous mixed metal-titanium oxide catalysts of this invention can be modified by the addition of promoter metals. The catalysts can be improved particularly by promoters selected from V, Cr, Mo, W, Mn, Fe, Co, Ni, and Cu. The promoters are preferably introduced into the mixed metal oxide-titanium oxide catalyst by standard incipient wetness impregnation techniques using selected metal salt solutions. Metal salts useful for impregnation of the metal oxide catalyst include metal nitrates, metal isopropoxides, metal sulfates, and metal halides among others of the above promoter metals. Promoter metals are incorporated into the homogeneous metal oxide in proportions between about 0.1% and about 5% by weight.

In the incipient wetness impregnation method (outlined in Satterfield, C. N. (1991) *Heterogeneous Catalysis in Industrial Practice*, McGraw-Hill, New York), the pores of the catalyst are filed with a solution of the metal salt under vacuum and the resulting solution-impregnated material is dried and calcined, or reduced as required.

The promoted metal/$TiO_2$ catalyst is calcined in air at temperatures between about 100° C. and about 850° C. for about 4 to about 18 hours to obtain the promoted metal/$TiO_2$ catalyst.

The promoted metal oxide catalyst can also be made by the hydrolysis/coprecipitation of the Ti precursor, the second metal precursor and the promoter precursor to form coprecipitated hydroxides in a single step, followed by calcination of the coprecipitate. The promoter metal precursor can be selected from a nitrate, a halide, an alkoxide or related species.

Catalyst Characterization

Figure 2:
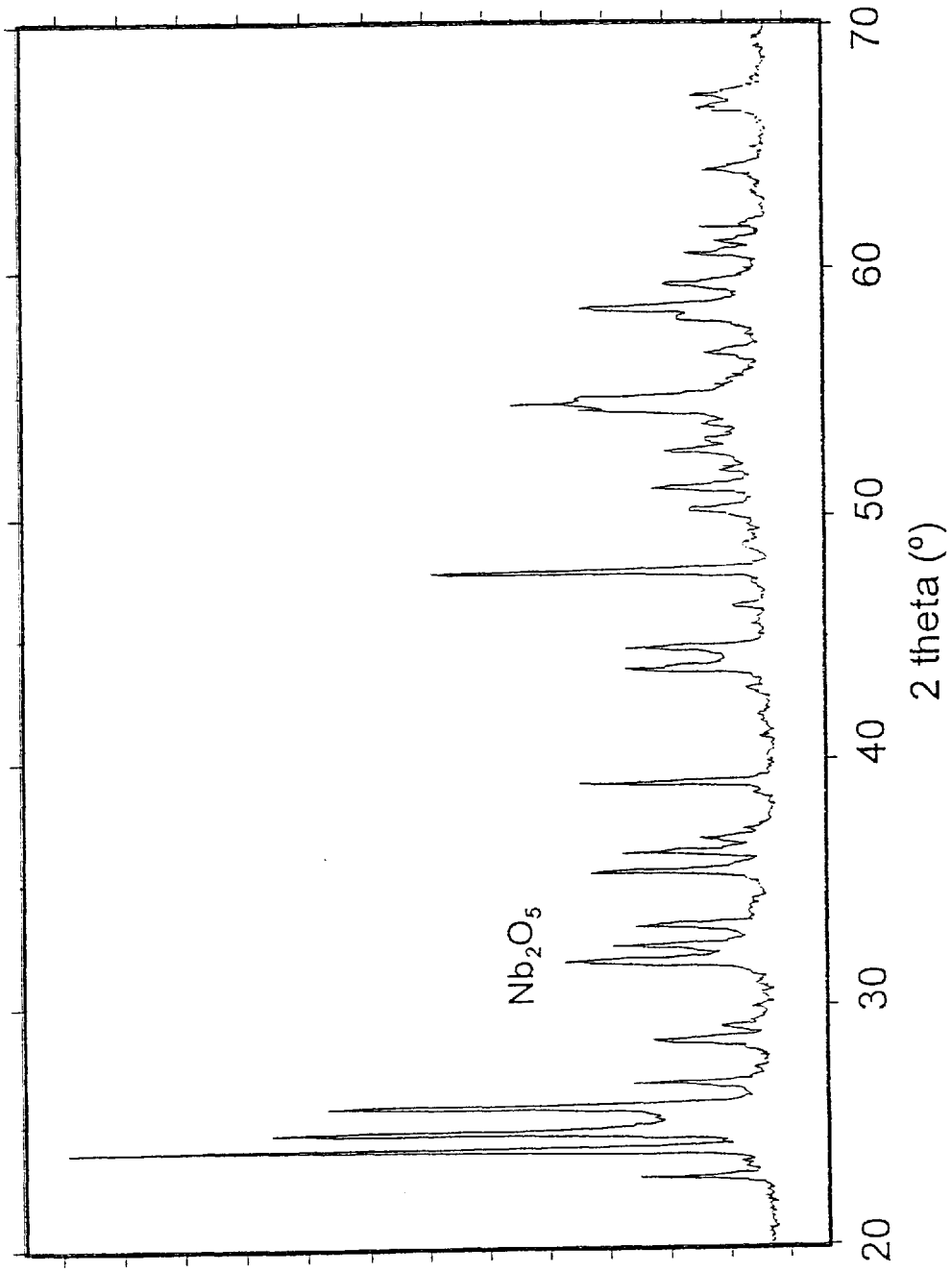
FIG. 2 provides an XRD trace for $Nb_2O_5$.
Figure 3:
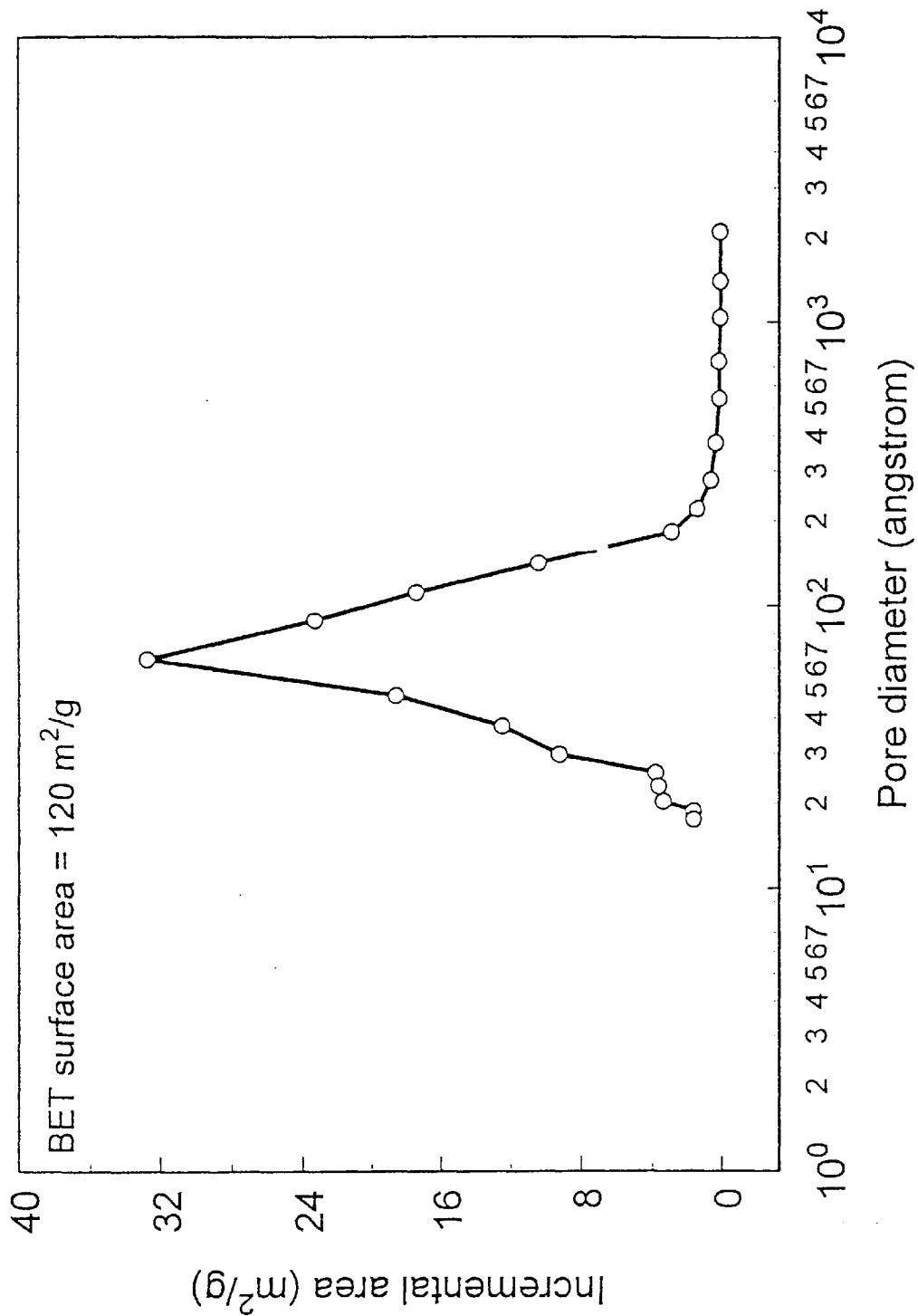
FIG. 3 is a graph of pore size distribution in a sample of 7.5%Nb/$TiO_2$ catalyst prepared by co-precipitation. Pore diameter in Angstrom (Å) is plotted against incremental surface area ($m^2/g$).

Homogeneous mixed metal oxide catalysts of this invention can be characterized using XRD (as illustrated in FIGS. 1 and 2 for Nb/$TiO_2$), XPS, XRF, and multi-point BET pore size distribution (as illustrated in FIG. 3 for Nb/$TiO_2$).

FIG. 1 shows the XRD patterns obtained for a 7.5%Nb-$TiO_2$ catalyst material made by coprecipitation (a), a 7.5%Nb-$TiO_2$ material made by incipient wetness impregnation of $TiO_2$ (b), and a commercially available $TiO_2$ (anatase) sample (c) for comparison. The Nb-impregnated $TiO_2$ was prepared by standard incipient wetness impregnation of anatase $TiO_2$ with niobium isopropoxide.

As FIG. 1 shows, the XRD pattern of the 7.5%Nb-$TiO_2$ (by coprecipitation) is very similar to that of the $TiO_2$ (anatase) XRD pattern. In comparison, the XRD pattern of the 7.5%Nb-$TiO_2$ made by incipient wetness impregnation, is different from that of the coprecipitation material. In addition to the $TiO_2$ peaks, a number of additional peaks which can be attributed to an $Nb_2O_5$ phase are observed in the sample made by impregnation. The XRD pattern of a $Nb_2O$ sample (purchased from Aldrich Chemical Company) is provided in FIG. 2 for comparison. The absence of any peaks attributable to $Nb_2O_5$ in the coprecipitated 7.5%Nb-$TiO_2$ sample, indicates that there are no large $Nb_2O_5$ crystallites (larger than about 20 Å) on the $TiO_2$ surface, consistent with a material that is a homogeneous mixture of the oxides of Nb and Ti. In contrast, the Nb-impregnated $TiO_2$ material appears to have relatively large $Nb_2O_5$ crystallites on the $TiO_2$ surface. Homogeneous mixed metal oxide catalysts of this invention will exhibit a similar XRD pattern to that of FIG. 1(a) where the features visible on the XRD pattern will be those attributable to $TiO_2$.

A detailed XPS analysis of the coprecipitated 7.5%Nb-$TiO_2$, $Nb_2O_5$, and $TiO_2$ samples was performed. This analysis indicated that Nb was in the +5 oxidation state in the coprecipitated 7.5%Nb-$TiO_2$ catalyst, and in $Nb_2O_5$. XPS analysis of the used coprecipitated 7.5%Nb-$TiO_2$ catalyst (after carrying out the hydrogen sulfide selective oxidation reaction for more than 40 hours) indicates that the Nb and the Ti composition and their oxidation states do not change during the reaction. Sulfur, present as $SO_4^{2-}$, was detected in the used catalyst. The XRF analysis of the Nb content in the fresh and used catalysts match the intended compositions to within about 1.3%.

Homogeneous mixed metal oxide catalysts of $TiO_2$ and metals other than Nb of this invention exhibit similar XPS and XRF analyses to those of homogeneous Nb/$TiO_2$ catalysts described herein.

A multi-point BET analysis (Satterfield, C. N. (1991) supra) of the catalyst was undertaken to determine the average BET surface area and the pore size distribution of the catalyst. The BET surface area of the catalyst was determined to be 120 m²/g. The pore size distribution of the 7.5%Nb/$TiO_2$ catalyst is shown in FIG. 3. The analysis shows that a significant fraction of the pores have a diameter between 30 and 100 angstroms.

Homogeneous oxide mixtures of this invention have been prepared having surface area ranging from about 60–140 m²/g. The pore sizes of a given catalyst once formed can be varied using techniques known in the art to optimize catalytic properties for a given application. For example, the pore sizes of homogeneous mixed metal oxides of this invention can be increased by addition of pore-forming precursor materials to the metal oxide powders, such as methylcellulose or polyethylene glycol, which will burn away during calcination, leaving behind large pores.

Catalyst Assessment

Activity and selectivity of mixed metal-titanium oxide catalysts of this invention were assessed at both high hydrogen sulfide concentrations (3% or higher) and low hydrogen sulfide concentrations (less than 3%) in the process gas stream. No significant differences in catalytic reactivity were observed as a function of hydrogen sulfide concentration in the reactant gas stream up to 8% $H_2S$.

During the testing of the catalysts, two types of reactors were used. For testing the catalysts with low concentrations of hydrogen sulfide, (less than 3%), an adiabatic reactor was used. In the Pyrex (Trademark, Corning) adiabatic reactor, catalyst powders were placed on a frit and the reactants were passed through the powder catalyst bed to determine the activity and selectivity of the catalyst. Due to inherent heat losses from the reactor, the temperature rise in the catalyst bed at low concentrations of hydrogen sulfide in the reactant feed gas is not significant enough to affect the activity or selectivity of the catalyst. At higher concentrations of hydrogen sulfide, an isothermal reactor was used.

The oxidation of hydrogen sulfide to sulfur and water is highly exothermic, causing a 60° C. temperature rise for each 1% of hydrogen sulfide oxidized to sulfur. When 3% or higher amounts of hydrogen sulfide in a gas stream is converted completely to sulfur, with an inlet temperature of the reactant gas at 200° C., the potential is high for developing hot spots in the catalyst bed. In order to maintain a more uniform temperature in the catalyst bed for testing higher concentrations of hydrogen sulfide in the feed, an isothermal Pyrex (Trademark) reactor was used. A 20" Pyrex reactor with an outside diameter of ¾" and with a quartz frit in the center was used to support the catalyst bed. A pyrex plug was also designed and fabricated to sit on the frit, such that, an annulus of 1–1.5 mm was formed between the inside of the reactor and the outside of the plug. An 18" Mellen furnace with a 6" isothermal heating zone was used to uniformly heat the annular catalyst bed. After the plug was positioned inside the reactor and supported on the frit, the catalyst powder was ground to less than 10 μm in diameter and poured into the annular space between the plug and the reactor. The catalyst was then heated to operating temperature by the Mellon furnace and the reaction feed gases were introduced.

Reactant gas flows were established using mass flow controllers. Water was introduced via a water saturator. The concentrations of hydrogen sulfide, oxygen, water, and sulfur dioxide in the reactant stream were determined prior to reaction by flowing the feed gas directly to the gas chromatograph (bypassing the reactor). Sulfur formed in the reactor was condensed and removed in a large condenser maintained at 80° C. The reacted gases flowing out of the condenser (possibly containing hydrogen sulfide, water, sulfur dioxide, nitrogen, oxygen and carbon dioxide) were then analyzed using an SRI gas chromatograph equipped with a TCD and an FID, and a Servomex oxygen analyzer. The hydrogen sulfide, sulfur dioxide, and the oxygen concentrations were quantified. All species detected in the GC were quantified. The $H_2S$ conversion, $X_{H_2S}$, and the S selectivity, $S_S$, are defined as follows:

$$X_{H_2S} = \frac{[H_2S]_i - [H_2S]_0}{[H_2S]_0} \times 100$$

$$S_s = \left[1 - \frac{[SO_2]}{[H_2S]_i - [H_2S]_0}\right]$$

where, the $[H_2S]_i$ and $[H_2S]_o$ are the reactor inlet and reactor outlet concentrations of hydrogen sulfide (in ppm volume), and $[SO_2]$ is the reactor outlet concentration of sulfur dioxide.

Figure 4:
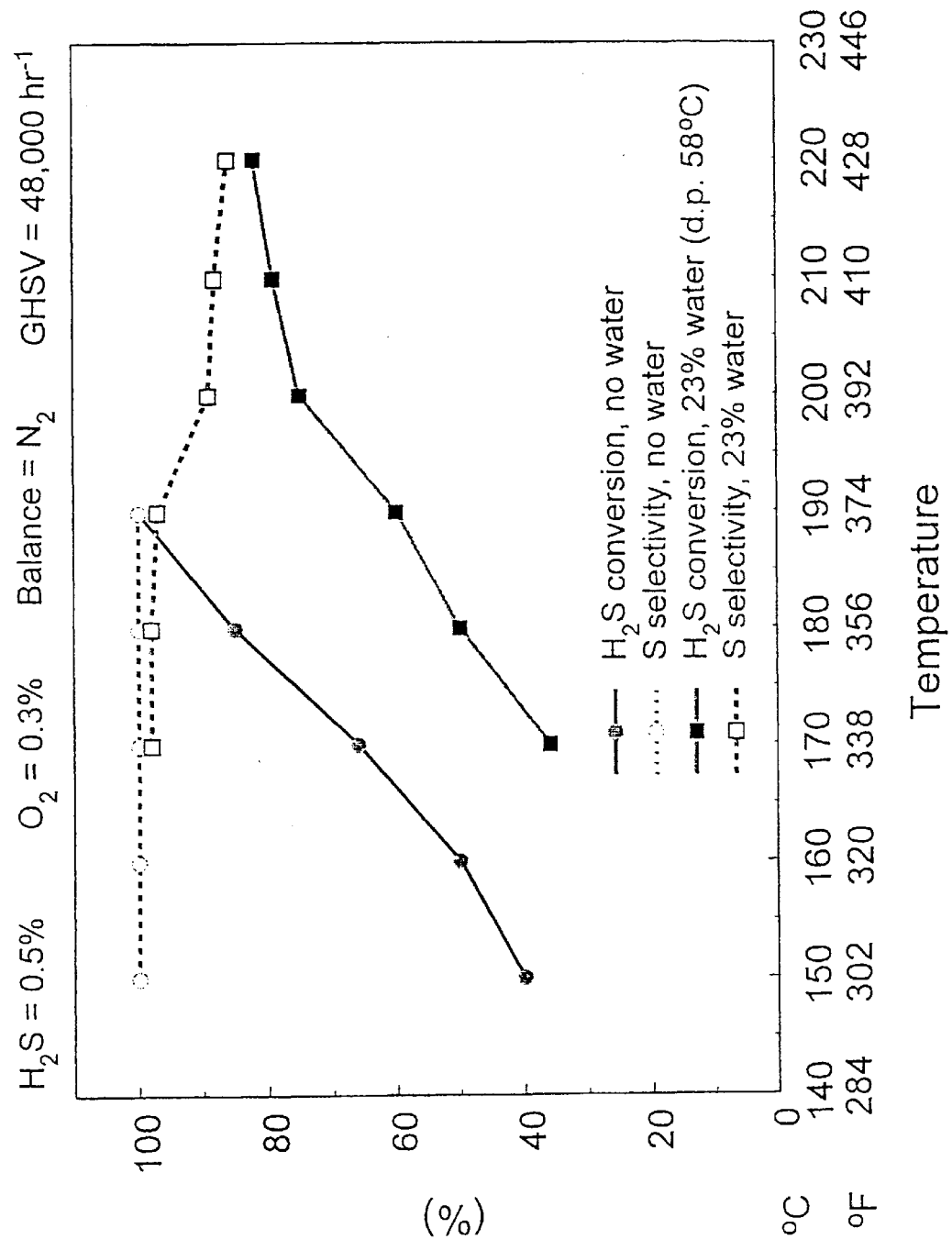
FIG. 4 is a graph of selectivity (dotted lines) and $H_2S$ conversion (solid lines)for sulfur on coprecipitated 7.5%Nb/ $TiO_2$ catalyst as a function of reaction temperature (140° C–230° C.) in a gas stream containing 0.5% $H_2S$/0.3%$O_2$/ 23% $H_2O$ (balance $N_2$) with GHSV=48,000 $hr^{-1}$. The graph compares reaction with no $H_2O$ (circles) to that in the presence of 23% $H_2O$ (squares).

The 7.5%Nb/TiO$_2$ catalyst was tested for its selective oxidation activity with 0.5% $H_2S$ in the feed in the presence and absence of water. FIG. 4 shows the $H_2S$ conversion and the S selectivity data on the 7.5%Nb/TiO$_2$ catalyst in the absence of water and in the presence of (23%) water as a function of catalyst temperature. The Nb/TiO$_2$ catalyst demonstrated almost 100% conversion of hydrogen sulfide with almost 100% selectivity to sulfur in the absence of water, at 190° C., whereas, in the presence of water in the feed, the catalyst maintained high selectivity for sulfur by showing a lower $H_2S$ conversion.

Figure 5:
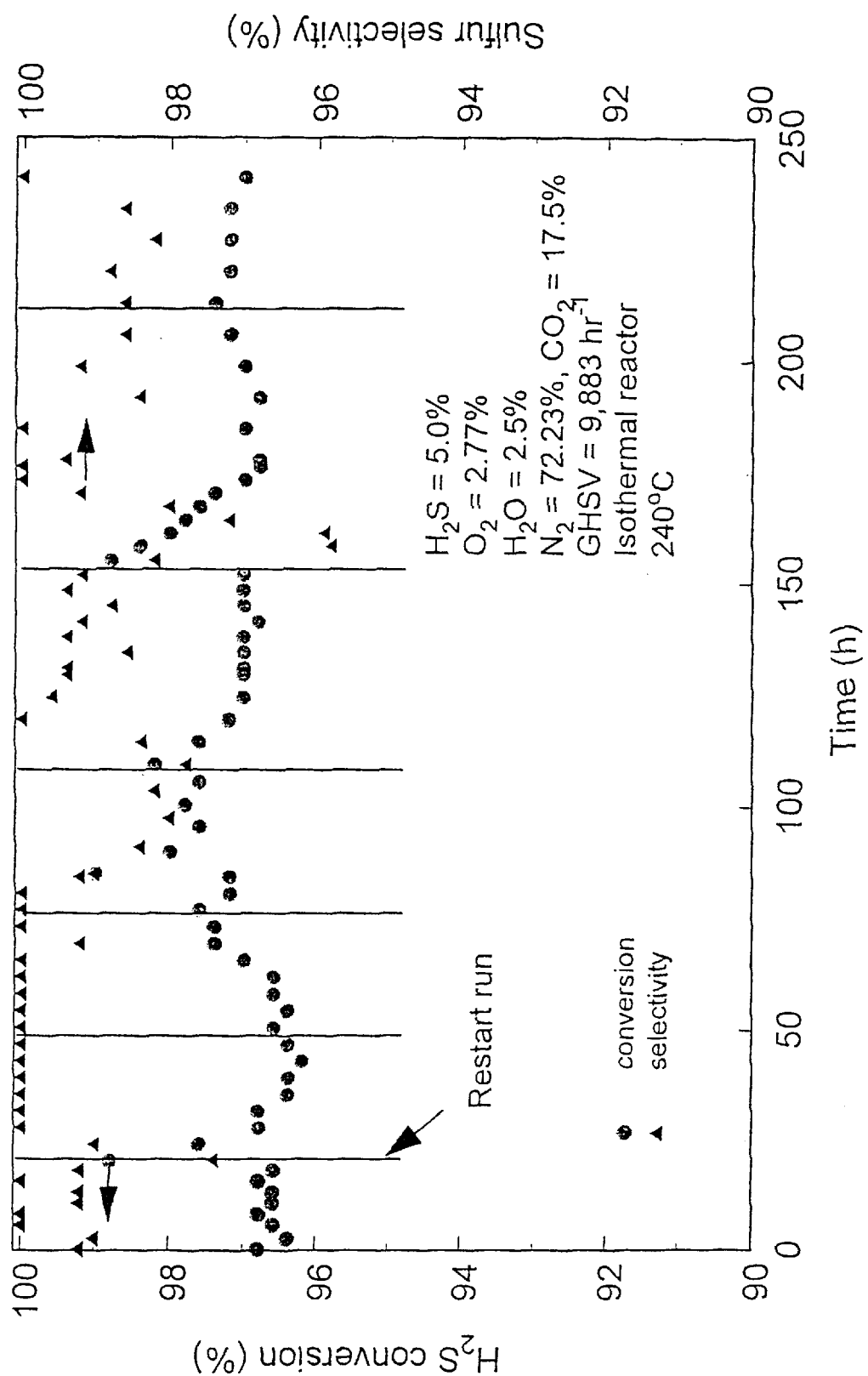
FIG. 5 is a graph of selectivity for sulfur (solid triangles) and $H_2S$ conversion (solid circles) of the coprecipitated 7.5%Nb/$TiO_2$ catalyst over a period of 250 hr at a temperature of 240° C. The reactant gas stream contained 5.0% $H_2S$, 2.77% $O_2$, 2.5% $H_2O$ and 17.5% $CO_2$ (balance $N_2$) with GHSV=9,883 $hr^{-1}$.

Performance of the Nb/TiO$_2$ catalyst as a function of time on stream (durability) was also tested. The results of the catalyst durability test in an isothermal reactor at 240° C. are shown in FIG. 5. The feed to the reactor contained 5% $H_2S$, 2.77% $O_2$, 2.5% $H_2O$ and 17.5% $CO_2$ (balance $N_2$) with GHSV=9,883 hr$^{-1}$. The catalyst durability was tested over a 250 hr duration. The reaction was momentarily stopped and restarted periodically (restart run) in order to replace the scrubber solution down stream of the reactor. The scrubber solution is used to remove any unreacted hydrogen sulfide, or formed sulfur dioxide, prior to venting the stream to the atmosphere. The data shows that the catalyst exhibited stable activity during the entire test. The $H_2S$ conversion was greater than 96% for the entire test period and S selectivity was greater than about 96% for a large portion of the test period. An interesting feature can be observed from the test results. The $H_2S$ conversion and the S selectivity of the catalyst appeared to go through a transient phase initially, when the reaction is restarted, followed by stable activity. The $H_2S$ conversion immediately upon starting up the reaction is higher than 98%, and the S selectivity is lower than 98%, and, the activity of the catalyst stabilizes out with time. The transient behavior may be due to a change in the oxidation state of the catalyst, induced by the hydrogen sulfide in the feed gas. Similar conversion, selectivity and performance were observed with up to 8% $H_2S$ in the feed gas.

Figure 6:
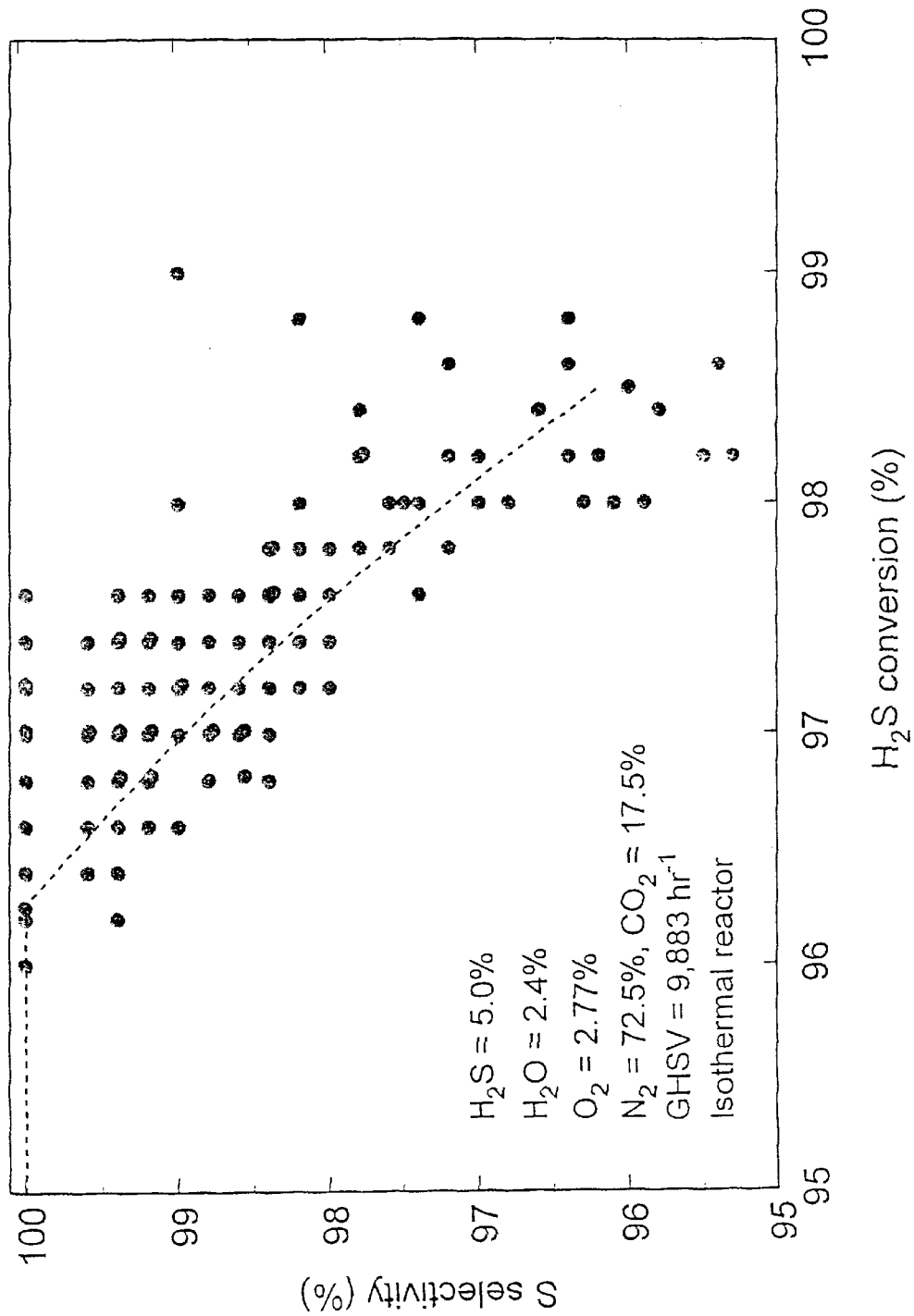
FIG. 6 is a graph plotting $H_2S$ conversion and S selectivity at time points from the durability test of FIG. 5. A least-square fit (dotted line) of the data indicates a general inverse trend between conversion and selectivity.

The relationship between the $H_2S$ conversion and S selectivity of the catalyst during the long term test of FIG. 5 is shown in FIG. 6 where S selectivity (%) was plotted as a function of the $H_2S$ conversion. The data was fitted using a least square fit routine. The data show a inverse trend between $H_2S$ conversion and S selectivity. At $H_2S$ conversion of 96% or less, S selectivity was 100%. As the conversion of hydrogen sulfide increased, the selectivity to sulfur decreased.

Effect of $O_2/H_2S$ ratio on catalyst activity and selectivity.

Figure 7:
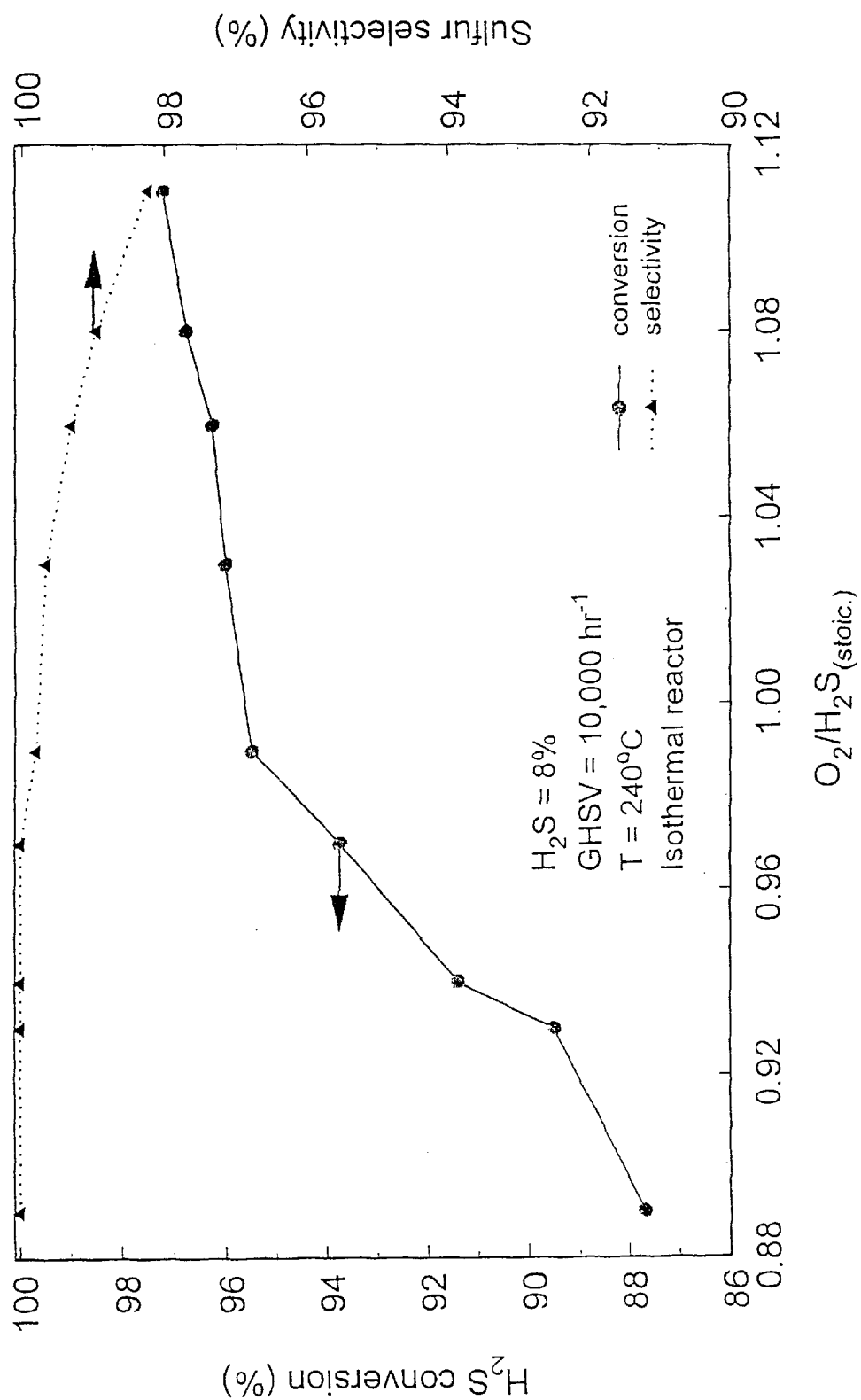
FIG. 7 is a graph of the effect of $O_2$/$H_2S$ ratio in the feed gas on $H_2S$ conversion (circles) and S selectivity (triangles) on a coprecipitated 7.5%Nb/$TiO_2$ catalyst ($H_2S$ in the feed held at 8% with GHSV=10,000 $hr^{-1}$). The $O_2$/$H_2S$ ratio plotted is the actual ratio in the feed relative to the stoichiometric ratio for the reaction (0.5). Ratios under 1 indicate a deficit of oxygen from stoichiometric and ratios over I indicate an excess over stoichiometric.

During testing of the coprecipitated 7.5%Nb/TiO$_2$ catalyst in the isothermal reactor, $H_2S$ conversion and S selectivity of the Nb/TiO$_2$ catalyst changed substantially with a change in the $O_2/H_2S$ ratio in the reactor feed. The stoichiometric ratio of oxygen to hydrogen sulfide for the selective oxidation reaction is 0.5. FIG. 7 shows the effect of variation of the $O_2/H_2S$ ratio in the feed gas on conversion (circles) and selectivity (triangles) of the coprecipitated 7.5%Nb/TiO$_2$ catalyst where the feed gas contained 8% $H_2S$. The $O_2/H_2S$ ratio plotted in FIG. 7 {$O_2/H_2S$(stoic.)} is the actual ratio relative to 0.5. An $O_2/H_2S$(stoic.) ratio of 0.9 in FIG. 7 means that there is a 10% deficit from stoichiometric in the oxygen concentration in the feed, on the other hand, a $O_2/H_2S$ (stoic.) ratio of 1.1 in FIG. 7 means that there is a 10% excess oxygen in the feed. For 7.5% Nb/TiO$_2$ at $O_2/H_2S$ feed gas ratios less than 1 (deficit from stoichometric), the conversion of $H_2S$ is less than 96%, and the S selectivity is approximately 100%. As the $O_2/H_2S$ feed gas ratio increases above 1 (excess over stoichiometric), the conversion increases (albeit more less markedly) and the S selectivity decreases from 100%. These results indicate that the $H_2S$ conversion and the S selectivity for a given catalyst of this invention can be varied by adjusting the $O_2/H_2S$ ratio in the feed. It is generally preferred to avoid excess oxygen to minimize sulfur dioxide formation.

Figure 8:
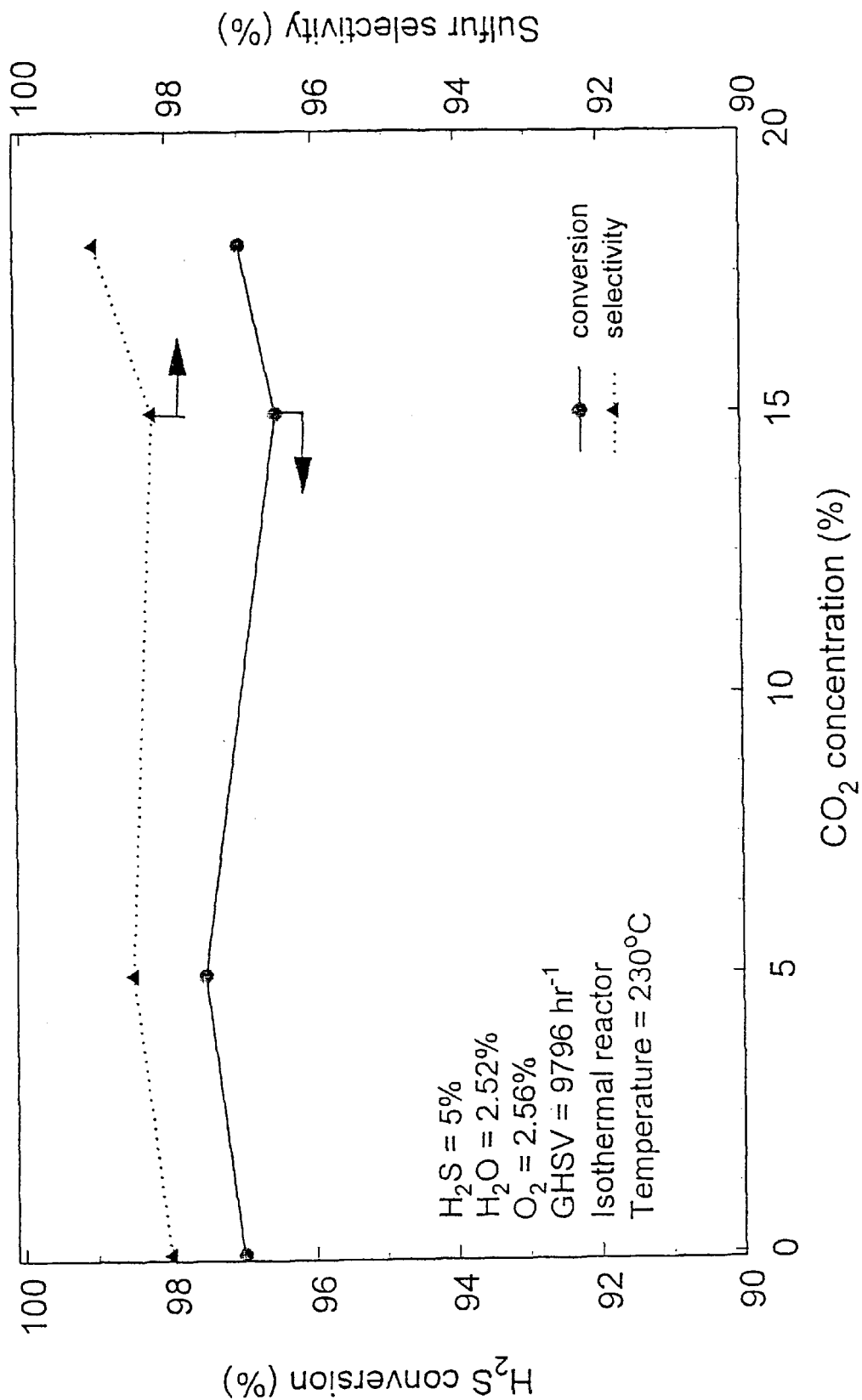
FIG. 8 is a graph of $H_2S$ conversion (circles) and S selectivity (triangles) on a coprecipitated 7.5%Nb/$TiO_2$ catalyst as a function of $CO_2$ in the feed gas ($H_2S$ in the feed held at 5%, $O_2$ at 2.56%, and $H_2O$ at 2.52%, balance $N_2$) with GHSV=9796 $hr^{-1}$).

Since carbon dioxide is a common constituent of amine generated gas, a hydrogen sulfide-selective oxidation catalyst should preferably operate effectively in the presence of relatively large concentrations of carbon dioxide (10–90%). FIG. 8 shows the effect of carbon dioxide in feed gas on the $H_2S$ conversion and the S selectivity of the 7.5%Nb/TiO$_2$ catalyst. The carbon dioxide concentration was varied between 0 and 18% and the catalyst activity and selectivity were measured at 230° C., with a gas hourly space velocity (GHSV) of 10,000 h$^{-1}$. Neither the $H_2S$ conversion, nor the S selectivity of the catalyst changed substantially with increasing carbon dioxide concentration, indicating that there was no carbon dioxide inhibition of the catalyst for the oxidation of hydrogen sulfide. Catalysts of this invention can function efficiently in the presence of any concentration of carbon dioxide in the feed.

Introduction of up to 14% of hydrocarbon, e.g., methane, in the feed had no significant effect on $H_2S$ conversion and S selectivity of the coprecipitated 7.5%$Nb/TiO_2$ catalyst. Further, no new by-products of reaction were observed on addition of methane to the feed. Introduction of up to 0.3% toluene in the feed to the reactor did not result in the deactivation of the catalyst.

Figure 9:
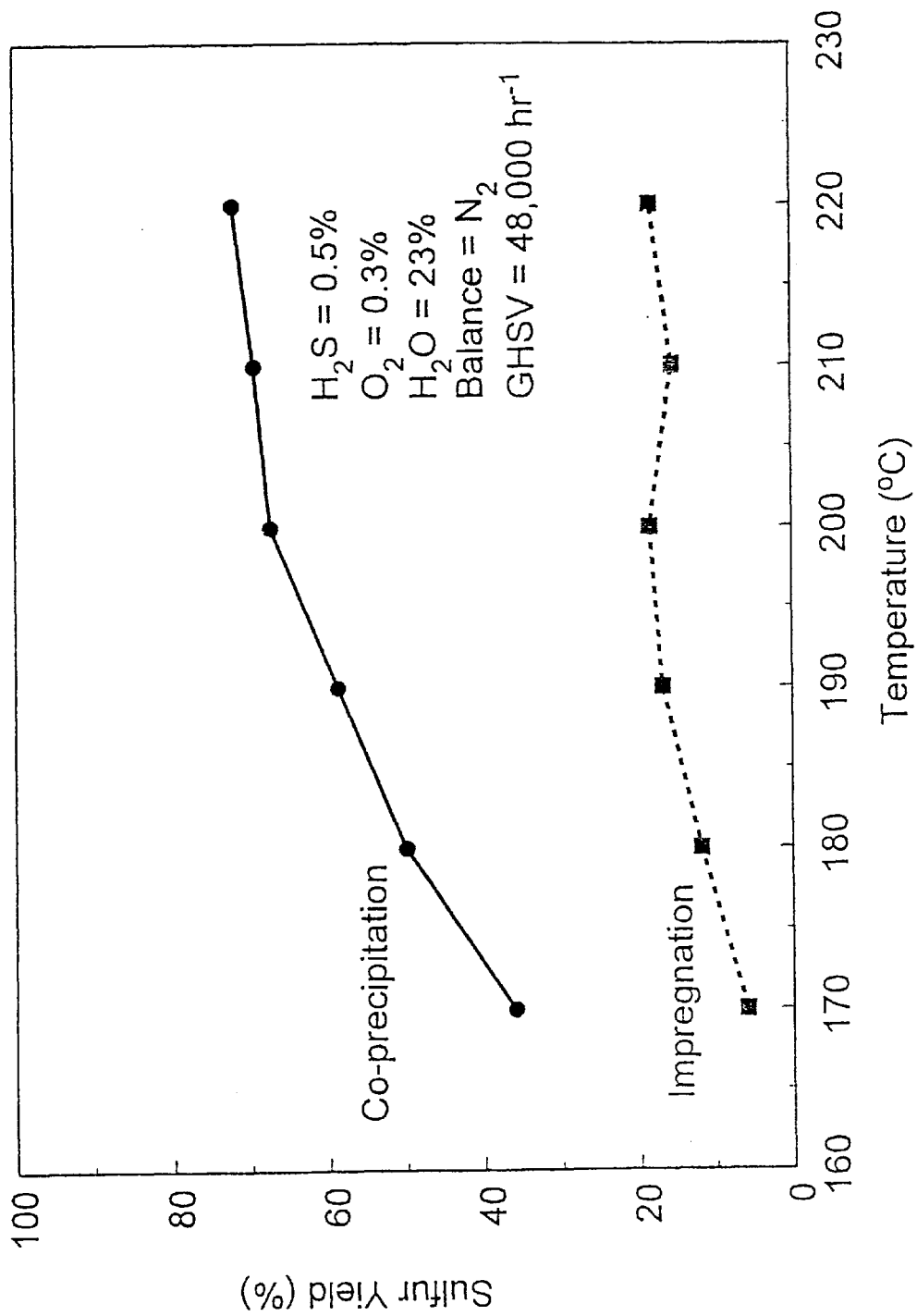
FIG. 9 is a graph comparing sulfur yield (%) for two 7.5%Nb/$TiO_2$ catalysts: the coprecipitated catalyst of this invention (circles) and an impregnated catalyst (squares) using a feed gas having 0.5% $H_2S$, 0.3% $O_2$, and 23% $H_2O$ (balance $N_2$) with GHSV=48,000 $hr^{-1}$ over a temperature range of 170° C. to 220° C.

The performance of coprecipitated 7.5%$Nb/TiO_2$ catalyst of this invention and a 7.5%$Nb/TiO_2$ catalyst prepared by incipient wetness impregnation technique were compared for reaction with a feed stream containing 0.5% $H_2S$ (0.3% $0_2$) and 23% $H_2O$. FIG. 9 plots the sulfur yield (S selectivity×$H_2S$ conversion/100) using either catalyst (coprecipitation=circles; impregnation=squares) as a function of temperature. The impregnated catalyst was made by incipient wetness impregnation of niobium isopropoxide or niobium chloride on anatase titania. The impregnated catalyst was then calcined at 450° C. for 16 hours, similar to the co-precipitated catalysts. As FIG. 9 shows, the sulfur yield on the co-precipitated catalyst was substantially higher than that of the impregnated catalyst. The dramatic difference in the performance of the catalysts as a function of their mode of preparation, is believed to be due to differences in structure of the two catalysts. As indicated above from XRD studies, the impregnated $Nb/TiO_2$ catalyst shows a distinct $Nb_2O_5$ phase, whereas, co-precipitated homogeneous $Nb/TiO_2$ catalyst containing the same amount of Nb does not show a distinct $Nb_2O_5$ phase. Further, $Nb_2O_5$ alone exhibits only very low catalytic activity for the oxidation of hydrogen sulfide under similar conditions. The highly active phase for the catalysis is, thus, not the distinct $Nb_2O_5$ phase, but rather, is believed to be the homogeneous mixture of the oxides of Nb and Ti. The co-precipitation procedures described herein provide methods of generating this homogeneous mixture conveniently.

Figure 10:
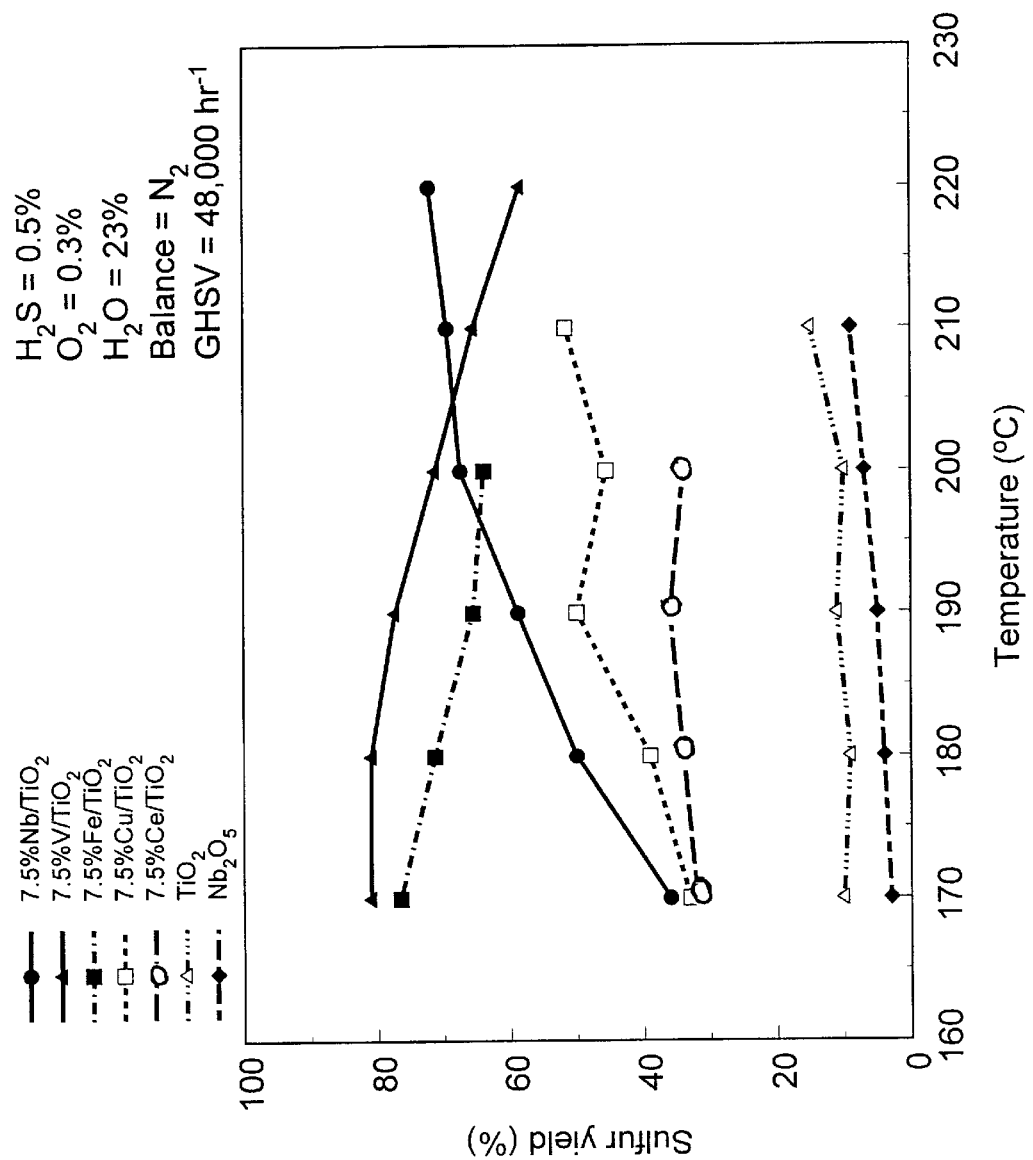
FIG. 10 is a graph comparing sulfur yield as a function of reactor temperature for coprecipitated 7.5% metal/$TiO_2$ catalysts of this invention. Data where M is Nb are closed circles, where M is V are closed triangles, where M is Fe are closed squares, where M is Cu are open squares, where M is Ce are open circles. The reactor feed gas contained 0.5% $H_2S$, 0.3% $O_2$, and 23% $H_2O$ (balance $N_2$) with GHSV=48, 000 $hr^{-1}$. Results obtained using anatase $TiO_2$ (open triangles) and $Nb_2O_5$ (closed diamonds) as selective oxidation catalysts are compared.

In addition to $Nb/TiO_2$, other metal/$TiO_2$ catalysts were also synthesized and tested for their selective oxidation activity. FIG. 10 plots sulfur yield during the selective oxidation of 0.5% $H_2S$ in the presence of 23% water, on a series of coprecipitated 7.5%M/$TiO_2$ catalysts, where M=Nb (closed circles), V (closed triangles), Fe (closed squares), Cu (open squares), Ce (open circles), as a function of temperature. Sulfur yield is the product of $H_2S$ conversion (%) and S selectivity (%)/100. The low temperature (<190° C.) sulfur yield of the catalysts decreased in the following order V/$TiO_2$>Fe/$TiO_2$>Nb/$TiO_2$>Cu/$TiO_2$>Ce/$TiO_2$. However, at temperatures greater than about 200° C., sulfur yield decreased in the following order: Nb/$TiO_2$>V/$TiO_2$>Fe/$TiO_2$>Cu/$TiO_2$>Ce/$TiO_2$. The data obtained on $TiO_2$ (anatase) and $Nb_2O_5$ (open triangles and closed diamonds, respectively) are provided for reference.

Promoted $Nb/TiO_2$ catalysts have been synthesized for the selective oxidation of $H_2S$ to S. Promoted catalysts typically have a higher activity and selectivity than the corresponding mixed metal/$TiO_2$ catalysts. In addition, the promoted catalysts typically exhibit improved activity and/or selectivity in the presence of high concentrations of water (up to about 30%) in the feed.

Figure 11:
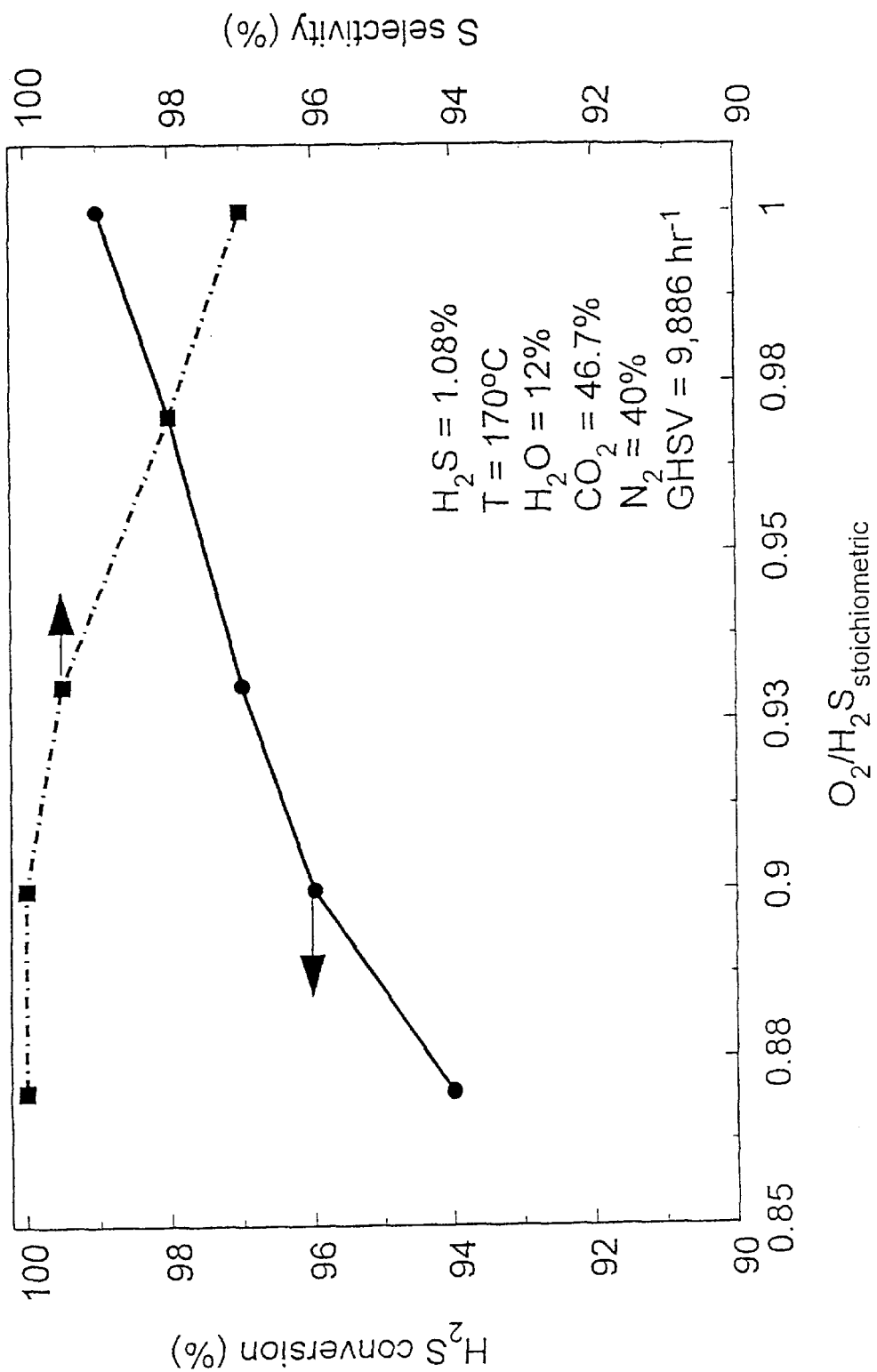
FIG. 11 is a graph of $H_2S$ conversion (circles) and S selectivity (squares) by 0.5% Vanadium-promoted coprecipitated 7.5%Nb/$TiO_2$ catalyst as a function of $O_2$/$H_2S$ (stoic.) at 170° C. in the presence of water and carbon dioxide in the feed with GHSV=9,886 $hr^{-1}$.The reactant feed contained 1.08% $H_2S$, 12% $H_2O$, and 46.7% $CO_2$ (balance $N_2$).
Figure 12A:
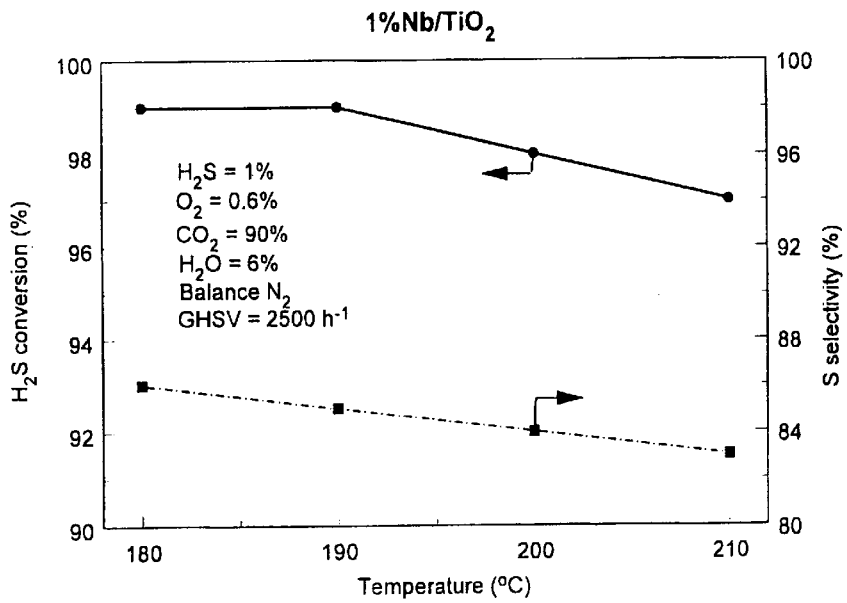
FIGS. 12A–12E are graphs of $H_2S$ conversion (circles) and S selectivity (squares) as a function of temperature for coprecipitated Nb/$TiO_2$ catalysts with varying amount of Nb. Catalyst performance is illustrated for Nb content of 1 mol %, 2.5 mol %, 5 mol %, 7.5 mol % and 10 mol % in FIGS. 12A–E, respectively.
Figure 12B:
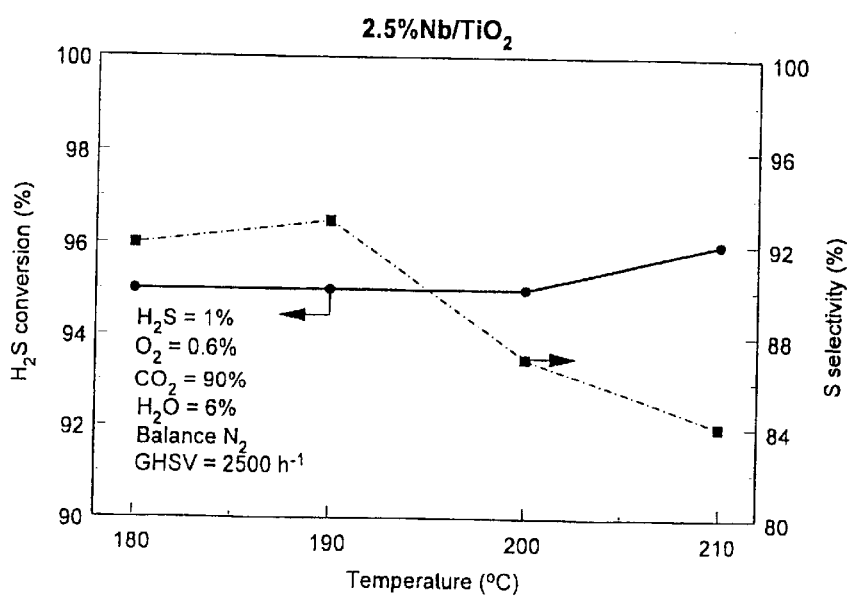
Figure 12C:
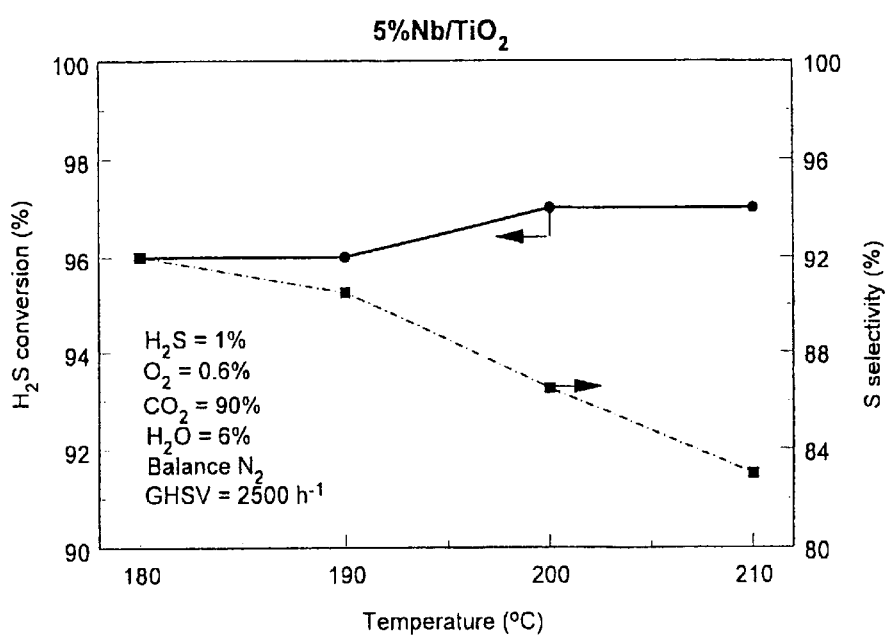
Figure 12D:
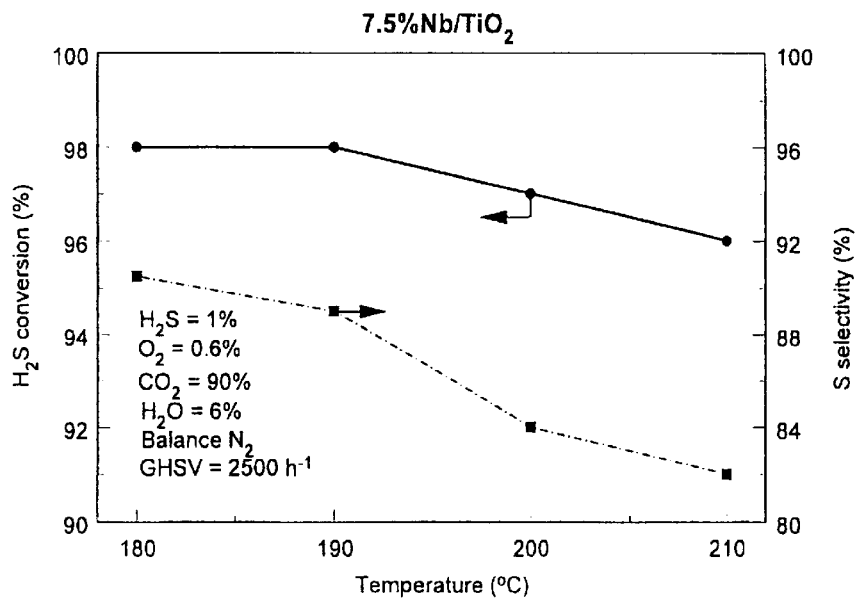
Figure 12E:
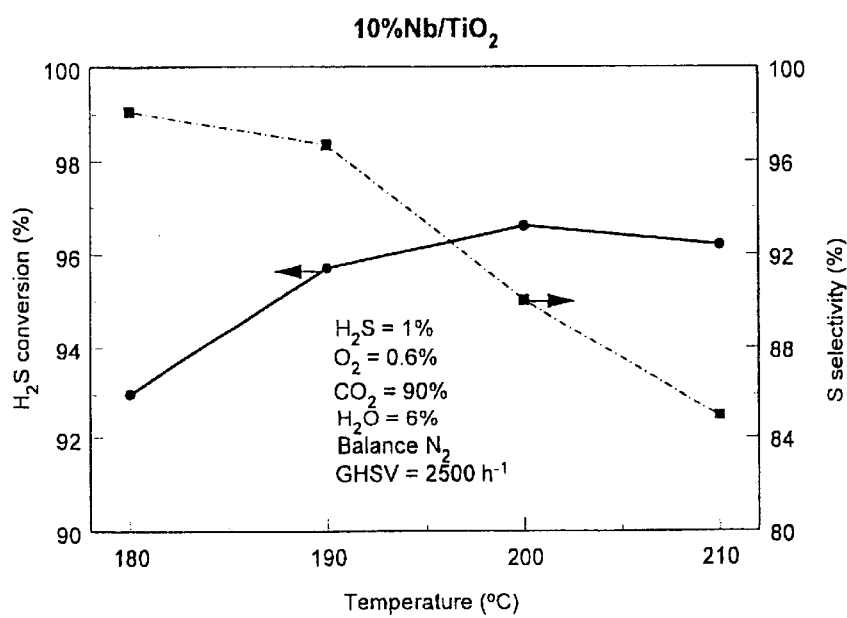

$H_2S$ conversion and S selectivity of a promoted catalyst of this invention, specifically 0.5%V/7.5%$Nb/TiO_2$, as a function of the $O_2/H_2S$ ratio in feed gas is illustrated in FIG. 11. The reaction temperature was maintained at 170° C. The 0.5%V/7.5%$Nb/TiO_2$ catalyst was synthesized from 7.5% $Nb/TiO_2$ homogeneous mixed metal oxide catalyst prepared by hydrolysis/coprecipitation. The required amount of V was added to the calcined homogeneous 7.5% $Nb/TiO_2$ employing the incipient wetness impregnation procedure using a solution of vanadium oxysulfate ($VOSO_4$) in water. The impregnated catalyst was then dried at 80° C., and calcined at 350° C. for 16 hours to provide the 0.5%V/7.5%$Nb/TiO_2$ catalyst The data shown in FIG. 11 indicate that vanadium acts as a promoter to the $Nb/TiO_2$ catalyst and increases the activity and selectivity of the catalyst even in the presence of a high concentration of water. Even in the presence of 12% water in the feed, the vanadium-promoted catalyst showed 97% $H_2S$ conversion and 99% S selectivity at an $O_2/H_2S$ feed gas ratio of 1. As the ratio of $O_2/H_2S$ in the feed gas was decreased, $H_2S$ conversion decreased, but the S selectivity increased to 100%.

In addition to V, various metals including as Ni, Cr, Mn, Co, W, and Mo were also investigated for their promoting ability of the 7.5%$Nb/TiO_2$ catalyst. The loading of these metals on the 7.5%$Nb/TiO_2$ catalyst was maintained at 0.1 mol %. The $H_2S$ conversion and the S selectivity of these promoted catalysts are provided in Table 1.

TABLE 1

$H_2S$ conversion and S selectivity for promoted $Nb/TiO_2$ catalysts.

| Catalyst | $H_2S$ Conversion (%) | | | | S selectivity (%) | | | |
| --- | --- | --- | --- | --- | --- | --- | --- | --- |
| Temperature (° C.) | 180 | 190 | 200 | 210 | 180 | 190 | 200 | 210 |
| 7.5% $Nb/TiO_2$ | 98.0 | 97.8 | 97 | 96.5 | 90 | 89 | 84 | 82 |
| 0.1% Ni(7.5% $Nb/TiO_2$) | 87.6 | 91.9 | 92.2 | 91.1 | 98.5 | 96 | 93 | 92.5 |
| 0.1% Cr(7.5% $Nb/TiO_2$) | 93.7 | 93.7 | 92.3 | ND | 96.6 | 94.3 | 93.4 | ND |
| 0.1% Mn(7.5% $Nb/TiO_2$) | 90 | 91.9 | 92.7 | 92.4 | 98.8 | 98 | 96.3 | 95 |
| 0.1% Co(7.5% $Nb/TiO_2$) | 88.3 | 91.2 | 92.9 | 92.5 | 98.8 | 98.2 | 96 | 94.5 |
| 0.1% W(7.5% $Nb/TiO_2$) | 89.9 | 92.1 | 93 | 92.5 | 98.9 | 98.3 | 96.5 | 95.3 |
| 0.1% Mo(7.5% $Nb/TiO_2$) | 93.7 | 95.3 | 95.5 | 95.1 | 98.7 | 98.4 | 97.6 | 97.1 |

Conditions: 1% $H_2S$, 0.6% oxygen, 6% $H_2O$, 70% $CO_2$, balance $N_2$, GHSV = 4,000 $h^{-1}$.

The effect of Nb content on the activity and selectivity of the coprecipitated catalyst was investigated. A series of $Nb/TiO_2$ catalysts were prepared with Nb loading of 1%, 2.5%, 5%, 7.5% and 10%. The catalysts were all made using the urea precipitation procedure, discussed above and illustrated in Example 1. The catalysts were all calcined at 450° C. for 16 hours and tested for their activity and selectivity for the oxidation of $H_2S$ to S. FIGS. 12(a)–(e) are graphs of $H_2S$ conversion and selectivity for the partial oxidation of $H_2S$ (1% in the feed) in the presence of 90% $CO_2$ and 6% $H_2O$ (balance $N_2$, at GHSV=2,500 $hr^{-1}$). It was found that the activity and selectivity of the catalysts were relatively insensitive to Nb content over the range examined. All the catalysts showed $H_2S$ conversions between 90% and 99%, and selectivities between 82% and 98% between 180° C. and 210° C.

Homogeneous mixtures of $TiO_2$ and a second metal oxide can be formed on carriers to provide improved supported catalysts for the partial oxidation of hydrogen sulfide to sulfur. The homogeneous mixture can be generated for example by in situ hydrolysis of a mixture of metal precursors on the carrier. For example, an appropriate support material is impregnated using the incipient wetness technique with a solution containing a mixture of metal precursors (salts or complexes). The impregnated carrier is treated to hydrolyze the metal precursors to hydroxides in situ on the carrier. The treated carrier is dried and calcined to oxidize the hydroxides to form a homogeneous mixture of metal oxides on the carrier. Appropriate carriers or supports include alumina, particularly $\alpha$-alumina, and silica. Supported catalysts made by this method exhibit high $H_2S$ conversion and high selectivity for sulfur.

The catalysts of this invention can be employed in a variety of forms, as powders, pressed pellets and other shaped structures and as supported catalysts as described above. The catalysts can be adapted for a variety of reactor designs including single or multiple-stage reactors, fixed bed or fluidized bed reactors among others. The catalysts can be employed for sulfur recovery in a variety of process applications functioning with high or low $H_2S$ concentrations and in the presence of relatively high levels of potential interfering components including water, carbon dioxide and hydrocarbons. The catalysts of this invention can be employed in combination with other processes for conversion of sulfur-containing components to sulfur. For example, the catalysts of this invention can be combined with processes which convert COS, $CS_2$, and alkylsulfides (e.g., $CH_3SH$) to $H_2S$ to provide for sulfur recovery from all of these sulfur-containing components.

The selective oxidation catalysts of this invention can be used or readily adapted for use in a variety of applications. For example, they can be employed in Claus tail-gas treatment processes, for sulfur recovery from refineries, off-shore platforms, coal gasifiers and for treatment of vent gases from water treatment plants. The catalysts are particularly useful for sulfur recovery from small-scale sour gas processing plants.

Those of ordinary skill in the art will appreciate that methods, techniques, and components other than those specifically described herein can be employed in the practice of this invention without departing from its spirit scope. The following examples illustrate the invention and are in no way intended to limit its scope.

EXAMPLES

Example 1

Preparation of 2.5%Nb/$TiO_2$

The following is a preparation procedure for making 10 lb of homogeneous 2.5%Nb/$TiO_2$ catalyst. To 1 liter of distilled water in a 3 L, beaker, 393.6 g of $NbCl_5$ (Noah Technologies) and 1 Kg of urea were added at room temperature and stirred until the $NbCl_5$ and the urea dissolved in the distilled water. The mixture was added to a 30 L glass reactor equipped with a stirrer and a heating jacket. Distilled water (14 L) was then added to the reactor at room temperature with the stirrer mixing the solution. In addition, 13.81 Kg of titanium oxysulfate (Noah Technologies) and 8.5 Kg of urea were also added to the reactor and the mixture was left to stir overnight (12–14 hours) at ambient temperature.

Following the mixing of the materials, the temperature of the reactor was gradually increased from room temperature to about 90° C. by flowing boiling water through the jacket. The pH of the solution was monitored periodically as a function of time and temperature. As the temperature of the mixture increased, the urea decomposed to release ammonia and $CO_2$. The pH of the solution increased gradually and stabilized out at about pH 8 after 12–24 hours of reaction. The mixture was then stirred for 2 hours at 90° C. to complete the reaction. The reaction temperature was then gradually cooled to about 30° C. by flowing cold water through the jacket. This precipitation procedure results in precipitating out all the Nb and Ti as hydroxides.

The slurry from the reactor was pumped through a filter press to filter the precipitate. The filtrate was recycled to the reactor until the filtrate was clear. The filter cake was washed in the filter press by pumping distilled water through the cake. The cake was then removed from the filters and sent for pelletizing and calcination.

After washing, the cake was either calcined directly, or extruded into pellets and then calcined in a furnace in air at 450° C. for 16 hours.

Example 2

Preparation Procedure for Making a 10 wt % (7.5%Nb/$TiO_2$) Catalyst Supported on $\alpha$-$Al_2O_3$ Pellets $\alpha$-$Al_2O_3$, 20 g as ⅛ inch pellets (Norton Chemical Process Products Division) was degassed using a vacuum pump in a three neck flask. Following the degassing, a mixture of 7.64 ml of niobium isopropoxide and 7.22 ml of titanium isopropoxide in isopropanol were impregnated into the $\alpha$-$Al_2O_3$ sample at room temperature using the incipient wetness impregnation technique. Following impregnation, the impregnated pellets were treated in steam for 12–16 hours to hydrolyze the isopropoxides. The treated pellets were then dried at 120° C. in air for 2 hours and calcined at 450° C. for 16 hours to oxidize the hydroxides. The pellets were then crushed and tested for their activity and selectivity for the oxidation of $H_2S$ to S. The $H_2S$ conversion of the supported catalyst was between 85% and 92% at temperatures of 170° C.–210° C., and the selectivity was greater than 95% over this same range. The overall sulfur yield of the pellet catalyst was slightly lower than a comparable coprecipitated 7.5%Nb/$TiO_2$ catalyst.

We claim:

1. A process for oxidizing hydrogen sulfide to elemental sulfur which comprises the step of contacting hydrogen sulfide together with an oxygen-containing gas with a catalyst which comprises a mixture of titanium oxide and a second metal oxide which can be selected from the group of metal oxides of Mn, Co, Cu, Nb, Mo, Tc, Ru, Rh, Hf, Ta, W, Au, La, Ce, Pr, Nd, Pm, Sm, Eu, Gd, Tb, Dy, Ho, Er, Tm, Yb, Lu and mixtures thereof and wherein said catalyst is held in a reactor at temperatures high enough to avoid condensation of sulfur on the catalyst.

2. The process of claim 1 wherein said second metal oxide is selected from the group consisting of metal oxides of Nb, Mo, and Ce.

3. The process of claim 1 wherein the second metal oxide is a metal oxide of Mo.

4. The process of claim 1 wherein the second metal oxide is a metal oxide of Ce.

5. The process of claim 1 wherein said catalyst further comprises a promoter metal oxide selected from the group consisting of metal oxides of transition metals, lanthanide metals and mixtures thereof and wherein the promter metal oxide is not the same as the second metal oxide.

6. The process of claim 5 wherein said promoter metal oxide is selected from the group consisting of metal oxides of V, Cr, Mn, Fe, Co, Ni, Cu, Nb, Mo, Tc, Ru, Rh, Hf, Ta, W, Au, La, Ce, Pr, Nd, Pm, Sm, Eu, Gd, Tb, Dy, Ho, Er, Tm, Yb, Lu and mixtures thereof.

7. The process of claim 5 wherein said promoter metal oxide or mixture of metal oxides is present in said catalyst in an amount from about 0.01 mol % to about 5 mol %.

8. The process of claim 5 wherein said catalyst further comprises a promoter metal oxide selected from the group consisting of the oxides of Ni, Fe, Cr, Mn, Co, W, Mo and mixtures thereof.

9. The process of claim 8 wherein said second metal oxide is selected from the group consisting of metal oxides of Nb, Mo and Ce.

10. The process of claim 1 wherein said mixture of titanium oxide and a second metal oxide is a homogeneous mixture.

11. The process of claim 1 wherein said mixture of titanium oxide and a second metal oxide is prepared by initial coprecipitation of a mixture of hydroxides of titanium and of said second metal.

12. The process of claim 1 wherein said mixture of titanium oxide and a second metal oxide is prepared by incipient wetness impregnation of titanium oxide with a solution of a precursor of the metal of said second metal oxide.

13. The process of claim 1 wherein said mixture of titanium oxide and a second metal oxide contains 30 mole % or less of the second metal oxide.

14. The process of claim 1 wherein said catalyst further comprises sulfides or sulfates of titanium or of the metal or metals of said second metal oxide.

15. The process of claim 1 wherein said catalyst further comprises a binder.

16. The process of claim 1 wherein said catalyst further comprises a support material wherein said mixture of titanium oxide and a second metal oxide is supported on the support material.

17. The process of claim 1 wherein said hydrogen sulfide is present in a gas stream and wherein said gas stream is contacted together with an oxygen-containing gas with said catalyst.

18. The process of claim 17 wherein said gas stream also contains water vapor.

19. The process of claim 17 wherein said gas stream also contains hydrocarbons.

20. The process of claim 17 wherein said gas stream also contains carbon dioxide.

21. The process of claim 1 wherein said catalyst is held in a reactor at temperatures from about 100° C. to about 400° C.

22. The process of claim 1 wherein said catalyst is held in a reactor at temperatures from about 170° C. to about 220° C.

23. The process of claim 1 wherein said catalyst is held in a reactor operated at temperatures greater than about 200° C.

24. The process of claim 1 wherein said mixture of titanium oxide and a second metal oxide has a surface area ranging from about 60 to about 140 $m^2/g$.

25. A process for oxidizing hydrogen sulfide to elemental sulfur which comprises the step of contacting hydrogen sulfide together with an oxygen-containing gas with a catalyst which comprises a mixture of titanium oxide and niobium oxide.

26. The process of claim 25 wherein said catalyst further comprises a promoter metal oxide selected from the group consisting of metal oxides of transition metals, lanthanide metals and mixtures thereof and wherein the promoter metal oxide is not the same as the second metal oxide.

* * * * *

UNITED STATES PATENT AND TRADEMARK OFFICE
CERTIFICATE OF CORRECTION

PATENT NO. : 6,099,819

DATED : August 8, 2000

INVENTOR(S) : Srinivas and Bai

It is certified that error appears in the above-identified patent and that said Letters Patent is hereby corrected as shown below:

In column 1, at approximately line 47, please delete "$SO_23S$" and replace with --$SO_2$-- .

In column 2, line 58, please delete "$FC_2O_3$" and replace with --$Fe_2O_3$--.

In column 3, line 3, please delete "$H_2SiO_2$" and replace with --$H_2S:O_2$--.

In column 7, line 29, please delete "20".

In column 7, line 47, please delete "5".

In column 8, line 2, please delete "50°C.- 50°C." and replace with --50°C.- 150°C--.

In column 8, line 10, please delete "25".

In column 8, line 60, please delete "fonned" and replace with --formed--.

In column 9, line 31, please delete "filed" and replace with --filled--.

In column 10, line 55, please delete "Coming" and replace with --Corning--.

UNITED STATES PATENT AND TRADEMARK OFFICE
CERTIFICATE OF CORRECTION

PATENT NO. : 6,099,819　　　　　　　Page 2 of 3

DATED : August 8, 2000

INVENTOR(S) : Srinivas and Bai

It is certified that error appears in the above-identified patent and that said Letters Patent is hereby corrected as shown below:

In column 11, please replace the equation at approximately line 37 "

$$X_{H_2S} = \frac{[H_2S]_i - [H_2S]_o}{[H_2S]_o} \times 100$$

with the equation --

$$X_{H_2S} = \frac{[H_2S]_i - [H_2S]_o}{[H_2S]_i} \times 100$$

--.

UNITED STATES PATENT AND TRADEMARK OFFICE
CERTIFICATE OF CORRECTION

PATENT NO. : 6,099,819

DATED : August 8, 2000

INVENTOR(S) : Srinivas and Bai

It is certified that error appears in the above-identified patent and that said Letters Patent is hereby corrected as shown below:

In column 11, in the equation at approximately line 42, after $$S_s = \left[ 1 - \frac{[SO_2]}{[H_2S]_i - [H_2S]_0} \right]$$

please insert -- ×100 --.

At column 13, line 15, please delete "O2" and replace with --$O_2$--.

Signed and Sealed this

Seventeenth Day of April, 2001

*Attest:*

NICHOLAS P. GODICI

*Attesting Officer*     Acting Director of the United States Patent and Trademark Office